United States Patent [19]
Rando et al.

[11] Patent Number: 5,128,520
[45] Date of Patent: Jul. 7, 1992

[54] SCANNER WITH COUPON VALIDATION

[75] Inventors: Joseph F. Rando, Los Altos Hills, Calif.; Jeffrey M. Novak, Eugene, Oreg.

[73] Assignee: Spectra-Physics, Inc., San Jose, Calif.

[21] Appl. No.: 392,851

[22] Filed: Aug. 11, 1989

[51] Int. Cl.$^5$ .................. G06K 15/00; G06F 15/21
[52] U.S. Cl. .................. 235/375; 235/383; 235/487; 235/462; 364/401
[58] Field of Search ............... 235/375, 376, 462, 383, 235/385, 387, 381; 364/401, 405

[56] References Cited

U.S. PATENT DOCUMENTS

| | | | |
|---|---|---|---|
| 4,554,446 | 11/1985 | Murphy et al. | 235/385 X |
| 4,791,281 | 12/1988 | Johnsen et al. | 235/462 X |
| 4,949,256 | 8/1990 | Humble | 364/405 X |
| 5,008,519 | 4/1991 | Cunningham et al. | 235/487 X |

OTHER PUBLICATIONS

*In re Kaslow*, 217 USPQ 1089 (1983).

*Primary Examiner*—Stuart S. Levy
*Assistant Examiner*—Joseph A. Rhoa
*Attorney, Agent, or Firm*—Thomas M. Freiburger

[57] ABSTRACT

A point of sale (POS) bar code scanner such as in common use in retail stores includes provision for reading bar coded redemption coupons (or other bar coded documents redeemable for value) in a manner secure from a human operator. Integration of functions between the POS scanner and the coupon reader varies with different embodiments described. Through software associated with bar code decoding logic, a comparison is made between information on a validation coupon and information on items presented for purchase, and a decision is made as to whether the redemption coupon is valid and redeemable in this transaction. In one embodiment, the bar code scanner simply receives the redemption coupon face down on the product scanner window, and integrated decode logic of the scanner identifies the bar code as belonging to a redemption coupon, then makes the comparison and validation of the coupon for the particular transaction. In some embodiments of the invention, the POS product scanner has a special beam exit window through which the scanning beam is diverted when it is signified that a redemption coupon is to be read, with a coupon reading scan pattern. After validation the coupon may be punched or otherwise cancelled, and/or sent to a secure container. Several types of securing devices are disclosed, for preventing subsequent use of redeemed coupons.

19 Claims, 16 Drawing Sheets

SCANNER WITH COUPON VALIDATION

BACKGROUND OF THE INVENTION

This invention is in the field of bar code scanners. More specifically, the invention relates to point of sale bar code scanners, and the problem of efficiently validating redemption coupons used at retail stores. More broadly, the invention is concerned with the redemption of anything of value bearing a bar code in a retail purchase transaction, including food stamps or other redeemable certificates.

Point of sale (POS) bar code scanners are in wide use in retail situations such as grocery stores, drug stores and general merchandising stores. Many of the stores which utilize or could utilize POS bar code scanners for scanning products for purchase also routinely honor coupons which grant the bearing customer a specified rebate on the purchase price of specifically identified items, usually within a prescribed period of time, prior to an expiration date. Each coupon usually specifies the item, its size, the value of the coupon against purchase of the item, and the expiration date. A customer may receive these coupons in several ways, such as from newspapers or magazines, from direct mail advertising, from purchase of another product, or of the same product at an earlier date, or from coupon books.

In typical use, these redemption coupons have been returned to the manufacturer or distributor of the affected products, for validation and reimbursement to the retail store by the manufacturer or distributor. The manufacturers or distributors have required this as a condition of reimbursement to the retailer.

However, this practice has been cumbersome and time consuming for the retailers and also for the manufacturers. Further, there was no guarantee to the manufacturer or distributor that the coupon was actually used within the allowed time period since there was a lag in time between redemption to the customer and return of the coupon to the manufacturer. The manufacturer did not even have sufficient control to assure that the proper purchase occurred for acceptance of the coupon.

Recently, there has been a move among manufacturers, coupon distributors and retailers toward a system in which return of the redeemed coupons to the manufacturer or distributor would not be necessary. A Joint Industry Task Force of food retailers and grocery manufacturers has been working on a uniform type of system for this purpose. The Task Force has been charged with setting standards and expediting the installation of coupon scanning and electronic clearing. It has been determined that bar codes will be put on redemption coupons. In such a system, strict validation and securing procedures would have to be followed at the point of sale, and with an appropriate reporting procedure to the manufacture so that validated, genuine transactions could be accurately reported and reimbursed to the retailer, eliminating or reducing the discretion of the check-out person.

One ultimate aim of such automated coupon processing can be electronic clearing of redemption coupons, similar to electronic banking, wherein the manufacturer is debited and the retailer credited automatically, eliminating several levels of manual clearing.

In contemplation of such a retail point coupon validation system, Advanced Promotion Technologies has marketed a system under the name Vision 500 Coupon Eater which consists of a redemption coupon reader and invalidator. Invalidation can comprise shredding or inking. This piece of equipment was designed to be used in connection with a point of sale retail bar code scanner, with information from the POS scanner sent to the coupon reader/shredder as to the content of the consumer items presented for purchase. The auxiliary coupon reader and shredder could then validate the actual purchase of each item as specified in the coupons presented for redemption, and validation could be made electronically in this way, with credit issued to the customer for redeemed coupons.

While the described auxiliary coupon reader system would appear to address the problem of efficient coupon validation, it required an additional piece of equipment and a cable interconnection with a product bar code scanner. It was connected generally between the scanner and the POS system (the terminal or cash register), and as such potentially could degrade product bar code reading performance. In this sense, the described previous system was inefficient and costly as compared to the present invention described below.

Another device aimed at validation of coupons is disclosed in U.S. Pat. No. 4,839,507. However, the system of that patent involved a separate machine for dispensing coins in redemption of coupons and it involved insertion of two coupons simultaneously.

SUMMARY OF THE INVENTION

In accordance with the present invention, a point of sale bar code scanner integrates the functions of coupon scanning, validation and securing with a fixed POS scanner normally used for scanning items for purchase. In one embodiment, the scanner utilizes the same reading beam for the reading of bar codes on redemption coupons as well as on products for purchase by the consumer. The same scanner housing can incorporate both functions. In another embodiment, a different reading beam can be used for coupons, and a wholly separate scanner can be provided, but with the same decoding and/or operating software as well as hardware used for both functions.

Principal aims of the invention are to make the coupon redemption process faster than conventional methods, in order to speed the checkout process and make the clearing process more efficient, as well as to provide a space-efficient and ergonomically efficient system at the checkout stand.

Through software associated with bar code decoding logic, a comparison is made between information on a redemption coupon and information representing items already presented for purchase, as determined from decoded bar codes of those items, and a decision is made as to whether the redemption coupon is valid and redeemable in this transaction. The decision preferably is based on whether the correct specific item identified in the coupon bar code has actually been purchased. It can also be based on the current date, for determination as to whether the redemption coupon is currently valid or has expired.

In one embodiment, the bar code scanner simply receives the redemption coupon face down on the product scanner window, and decode logic of the scanner identifies the bar code as belonging to a redemption coupon, then makes the comparison and validation of the coupon for the particular transaction. A credit can be issued automatically for the coupon redemption amount. Software is included for making the coupon identification, comparison and validation.

Additionally, there may be included a validated coupon receiving slot, into which must be fed a validated coupon for storage, shredding or other type of invalidation/cancellation before the scanner or cash register is enabled to complete the customer's transaction.

In another embodiment, the product scanner has a special beam exit window through which the scanning beam is diverted when it is signified that a redemption coupon is to be read. This diversion can be by a movable mirror.

There preferably is provided a special door for receiving redemption coupons. The opening and then closing of this coupon door may be connected to generate a signal that a redemption coupon rather than a purchased product is being read, to move a scan mirror from its normal position so as to divert the reading beam to form an alternate coupon reading scan pattern, and to enable a separate coupon decoding logic and comparison/validation logic. The latter logic compares the coupon bar code information with information on the list of products which are being purchased by the consumer in the transaction, and can also take into consideration the current date, and validates the redemption coupon on these bases.

The special coupon door in one embodiment opens to a slidable stage or tray which receives a coupon face down. Closing of the coupon door will cause the movement of the coupon stage to move the coupon across a field so as to assure a reading by the beam as scanned in the coupon reading scan pattern.

In this embodiment, provision preferably is also made for removing a coupon, once validated, to a storage or cancellation area to prevent the possibility of re-use.

In another embodiment, the special coupon door opens to a slot in a counter top or in the scanner itself or a side housing connected to the scanner. A sensor can be provided to sense the presence of an item in the slot, rather than relying solely on the opening and/or closing of the coupon door. The sensor then activates a motor which moves a mirror to divert a laser scan beam to pass through to the attached or integrated coupon reading device. As it passes through the slot, the coupon is scanned and read by the beam, which may be through a clear window which helps completely seal the coupon scanner from the entry of dirt and debris into the area of the beam, scanning mechanism and collection optics.

Once the coupon has been found valid and redeemable, the coupon can be fed through the slot with a motor and into a secure area beyond the reach of checkout personnel. This may be simply a secure bag or it may involve punching, shredding, inking or mutilating of the coupon to prevent a subsequent use. If the coupon is properly cancelled by physical indication of cancellation immediately after being found redeemable, it generally need not be placed in a secure container.

It is therefore among the objects of the present invention to enable automated and reliable validation of redemption coupons (and other bar-coded items redeemable for value) at point of sale retail stores, without the need for returning of redeemed coupons by the store to the manufacturer. An accompanying object is to accomplish this using a single bar code reading beam, i.e. the beam already provided with the POS bar code scanner, and/or common collection optics or decode software, so as to result in an economical and efficient system with minimal space requirements.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

FIG. 4A shows the door in an open position.

DESCRIPTION OF PREFERRED EMBODIMENTS

Figure 1:
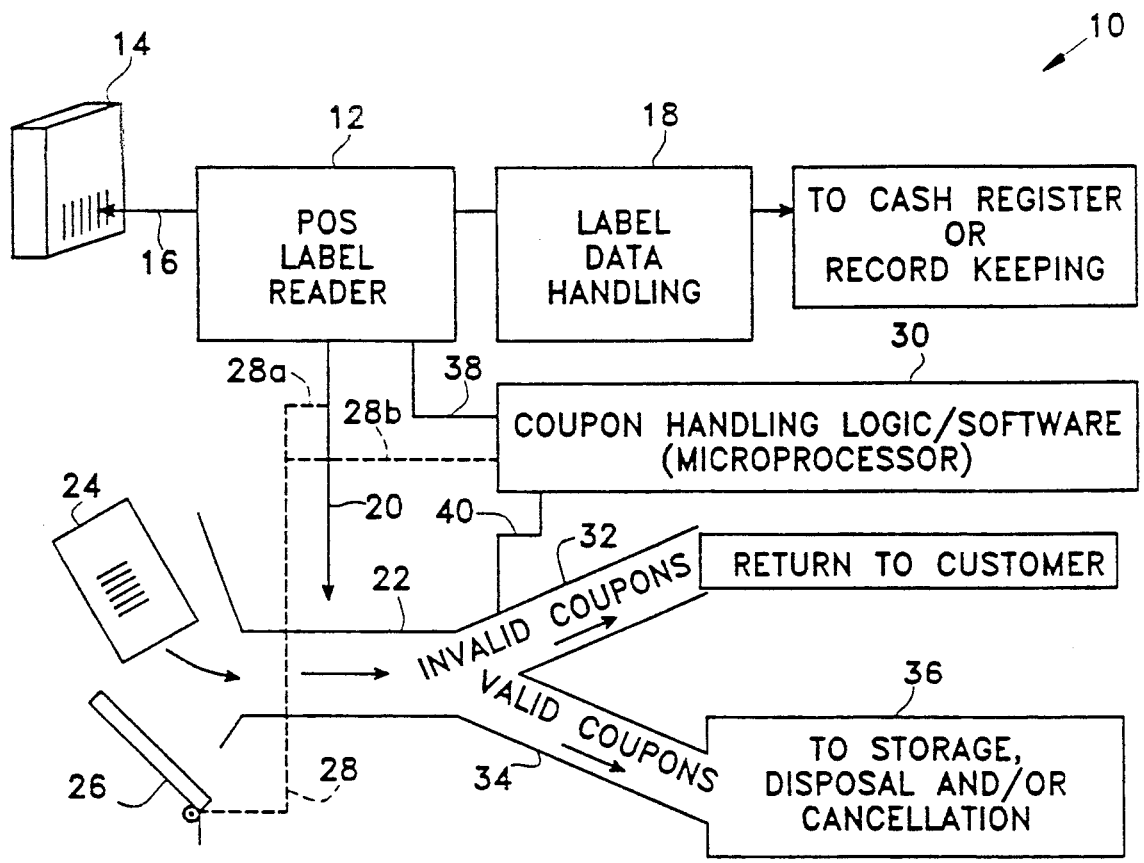
FIG. 1 is a block diagram and schematic indication of principal components in one embodiment of a retail bar code scanner with coupon validation, according to the principles of the invention.

In the drawings, FIG. 1 indicates schematically, and partially in block diagram form, principles of one embodiment of a redemption coupon reading system, in conjunction with a product bar code reading system, in accordance with the principles of the present invention.

As illustrated in FIG. 1, the system 10 has a product bar code label reader indicated by the block 12, preferably of a counter top type typical of point-of-sale bar code readers. Its function of reading a product 14 presented for purchase is indicated by the arrow 16.

The POS bar code label reader 12 is electronically connected to a label data handling system shown in the block 18, including decode logic and software for the handling of the decoded data and interfacing it with the cash register and/or transaction storage at a central processor, for example.

FIG. 1 also indicates the diversion of the normally scanned bar code reader beam from the label reader 12, at an arrow 20. The arrow 20 indicates the reader beam being taken out of the normal product scanning optics and diverted to a redemption coupon reading area 22. Into this coupon reading area 22 a redemption coupon 24 is inserted, then read by the beam 20. In some embodiments of the present invention, it will be necessary to open a coupon reader door 26, in some form, for insertion of the coupon 24.

FIG. 1 also shows that the opening and closing of the coupon reader door 26 may be coupled electronically and/or mechanically, via dashed lines 28, 28a and 28b, to effect the diverting of the beam 20 for the coupon reading function (as by moving a mirror); and to activate coupon handling logic and software (microprocessor) indicated in the block 30. The opening and closing of the door 26 may also activate further mechanical coupon handling, as described below with respect to several embodiments. In FIG. 1 this is indicated by movement of the redemption coupon 24 through the reading area 22 and then through one of two indicated handling branches: a branch 32 through which the coupon has returned to the customer (or to the clerk) because it has been found to be invalid for one reason or another as discussed above; or a second branch 34 for valid coupons, which may be sent automatically to a secure storage and/or disposal location 36, or simply for cancellation (physical marking, e.g. mutilation or inking). This is to prevent validated coupons from being re-used. Further branches could be included, as for classifying coupons by different types or products or different manufacturers.

As also indicated in FIG. 1, the coupon handling logic/software 30 is connected to the product bar code reader 12, indicated by a line 38, for several purposes. The data read from the bar code of the redemption coupon 24 is via collected light picked up in the reader 12, and this signal must be sent via the line 38 to the coupon handling logic/software 30. Also, once decisions are made in the logic/software 30, signals may be sent via the line 38 back to the label reader 12 so that the validation decision and its effect may ultimately be interfaced with the cash register, for properly crediting the customer on the purchase receipt. The coupon decode logic and software may be integrated with the software of the product label scanner system, as described below.

As also indicated, the coupon handling logic 30 is connected via a line indicated at 40 to the actual mechanical coupon handling, e.g. the sending of the coupon through the branch 32 or the branch 34.

The system 10 shown generally in FIG. 1 can be built by adding components 18, 22, 26, 28, 36, etc. to a laser product scanner system 12. The scanner 12 must be modified for the beam diversion 20, and certain software must be modified for interfacing the coupon logic/software 30 with the label reader 12 and with the cash register and transaction receipt printer.

Figure 2A:
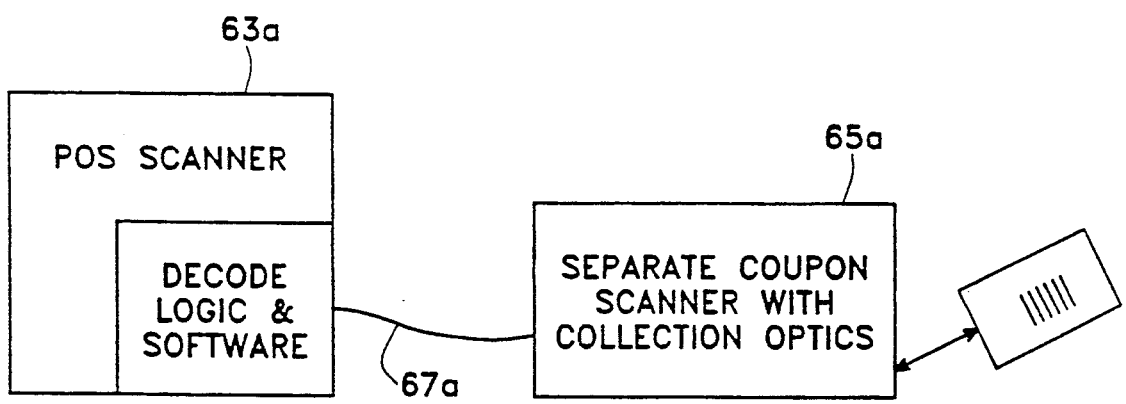
FIGS. 2A and 2B are simplified block diagrams showing different embodiments of systems of the invention.
Figure 2:
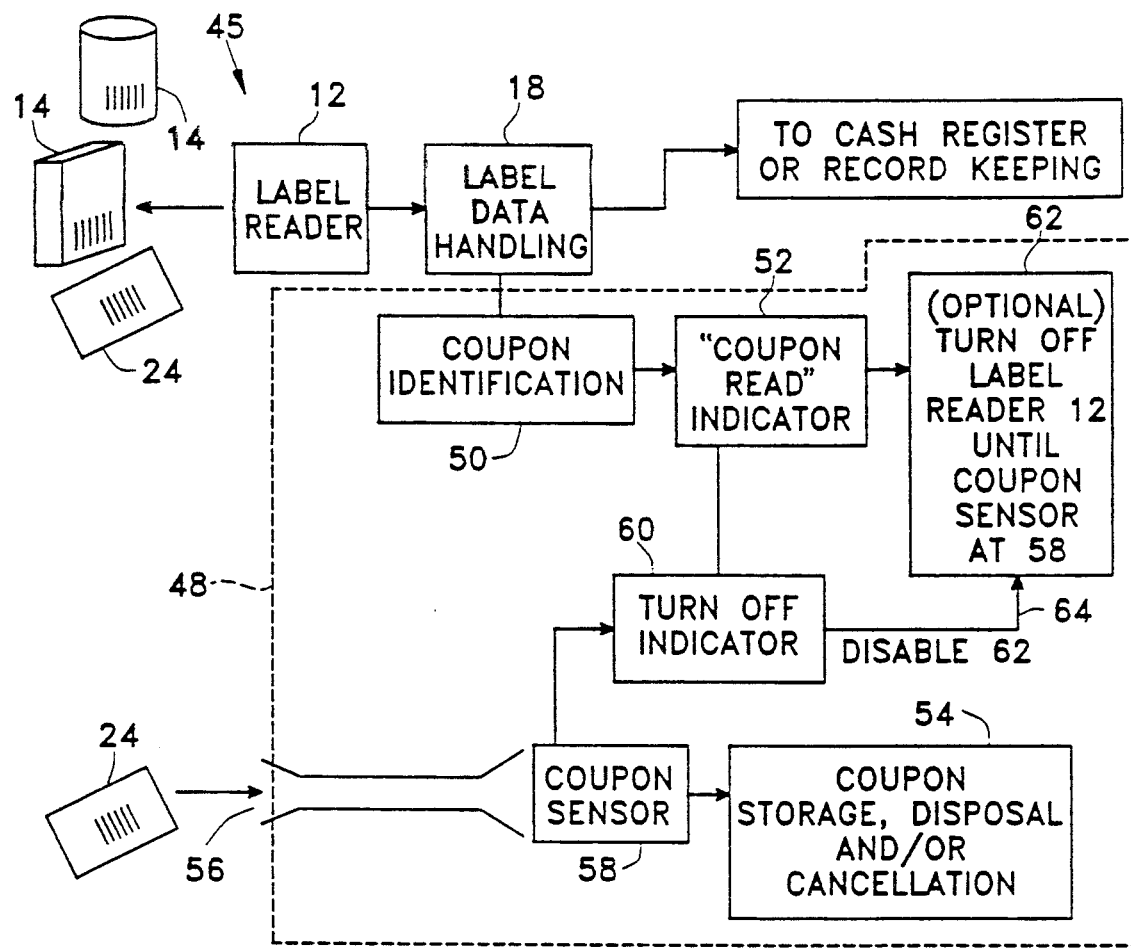
FIG. 2 is a block diagram similar to FIG. 1, but showing another embodiment of the invention wherein a different arrangement is employed for reading redemption coupon bar codes.

FIG. 2 shows in block diagram form a system 45 which differs in some respects from the system 10 illustrated in FIG. 1. The system 45 of FIG. 2 utilizes a conventional product label scanner 12 connected to label data handling 18, but without any special door or slot for inserting coupons for reading. Instead, in this embodiment the coupon 24 is simply placed adjacent to the product label reader 12 in a position to be read, and scanned in the same manner as consumer products 14 for purchase. The label data handling is simply programmed to include recognition of bar codes on redemption coupons 24, and to specifically recognize them as redemption coupons.

As indicated in FIG. 2, new hardware (and some software) added to the standard label reading system, to enable functions of the modified system 45, can include those items indicated inside the dashed-line box 48. This includes software confirming that a coupon has been identified, shown in the block 50, a "COUPON READ" indicator 52 to visually or audibly indicate to the check-out clerk and the customer that a redemption coupon has been read, and a location 54 for coupon storage and/or disposal. As indicated, there may be included a slot 56 for the clerk to insert a coupon 24 which has been read and validated, so that the coupon cannot be re-used. The "COUPON READ" indicator can serve as a signal that the coupon is valid for redemption in this particular transaction (i.e. the correct item or items were purchased to enable a redemption credit), which will constitute a signal that a credit will be issued via the label data handling 18 as interfaced with the cash register; in this case if an invalid coupon has been presented and identified this could be signified by no reaction from the label reader 12. Alternatively, there can be one indicator signifying simply that a coupon has been identified and a separate indicator signifying that the coupon is valid for redemption in this transaction. In this case the second indicator simply would not be activated in the event of an invalid coupon.

As shown in FIG. 2, the hardware can include a coupon sensor 58 en route to the disposal area 54, confirming that a coupon has been inserted for disposal (cancellation or secure storage). This can trigger the turning off of the "COUPON READ" indicator 52, as shown by the box 60. Sensors and software can also determine whether the coupon has jammed in the system or whether the coupon has been removed before scanning.

FIG. 2 shows an optional feature illustrated by the block 62. Once the "COUPON READ" indicator has been activated by the presence of a redemption coupon at the label reader 12, this can cause the label reader 12 to be turned off, disabling it from further functions and disabling the cash register from completing the consumer transaction, until a coupon is sensed at 58 as having been sent to the disposal/cancellation area. Therefore the system optionally can require a validated coupon to be inserted into a cancellation device or an inaccessible storage area before the consumer transaction can be completed, tending to prevent fraud in the use of the redemption coupons. Cancellation can be effected automatically on validation, as disclosed below in further embodiments. Once the coupon is sensed at 58, the block 62 is disabled, i.e. the label reader 12 is re-enabled, as illustrated in FIG. 2 by the arrow 64.

Figure 2B:
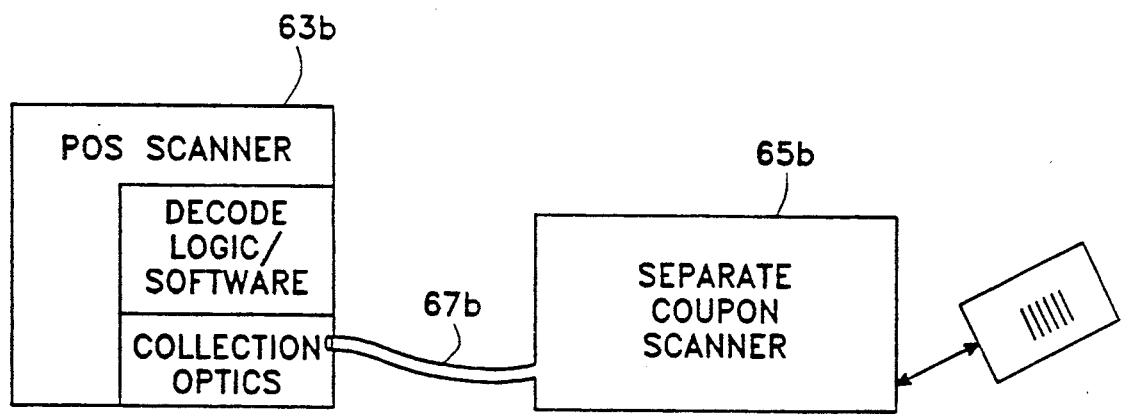

FIGS. 2A and 2B are block diagrams showing conceptually different embodiments of the present invention. The systems of these figures show alternate embodiments wherein a POS scanner 63a or 63b is connected to a separate coupon scanner 65a or 65b. These scanners are indicated as scanning redemption coupons and as sending information back to the POS (purchased item) scanner.

In the case of FIG. 2A, the separate coupon scanner 65a includes its own collection optics, as indicated. These optics generate electrical signals which are carried over an electrical conductor 67a to decode logic/software incorporated in the POS scanner 63a. In FIG. 2B the separate coupon scanner 65b does not include collection optics, but rather returns the collected light from the coupon via a fiber optic connector 67b, to collection optics incorporated in the POS scanner 63b.

Thus, as illustrated in the simplified block diagrams of FIGS. 2A and 2B, the principles of the invention include integrated systems wherein some element in the chain of scanning and decoding coupon bar codes is common with the parallel function of the POS scanner. The common element can be the light source or reading beam, the beam scanning equipment, the beam collection optics, the decode logic and software, or simply a common housing which reduces space requirements.

Figure 12:
FIG. 12 is a view showing a "Code A" UPC coupon bar code.

FIG. 12 shows a UPC (Universal Product Code) coupon bar code symbol as it can be applied to redemption coupons. This is a "Code A" type bar code of the type which is in conventional use for purchased products.

The following table identifies the function of different areas of the bar code as applied to coupons as compared to items for purchase.

TABLE 1

| | UPC Code Field Definitions | | |
|---|---|---|---|
| Field Definition | Field Position | Item Definition | Coupon Definition |
| Number System | 1 | 0, 6, 7 | 5 |
| Manuf. Id. (1) | 2-6 | Manuf.'s I.D. Number | Manuf.'s I.D. Number |
| Item Number (2) | 7-11 | Item Number | NA |
| Family Code (2) | 7-9 | NA | Family Code |
| Value Code (3) | 10-11 | NA | Value Code |
| MOD10 Check Digit | 12 | Check Digit | Check Digit |

Notes:
(1) Assigned by UCC.
(2) Assigned by Manufacturer.
(3) Fixed table of 100 possible values defined by UCC.

Figure 13:
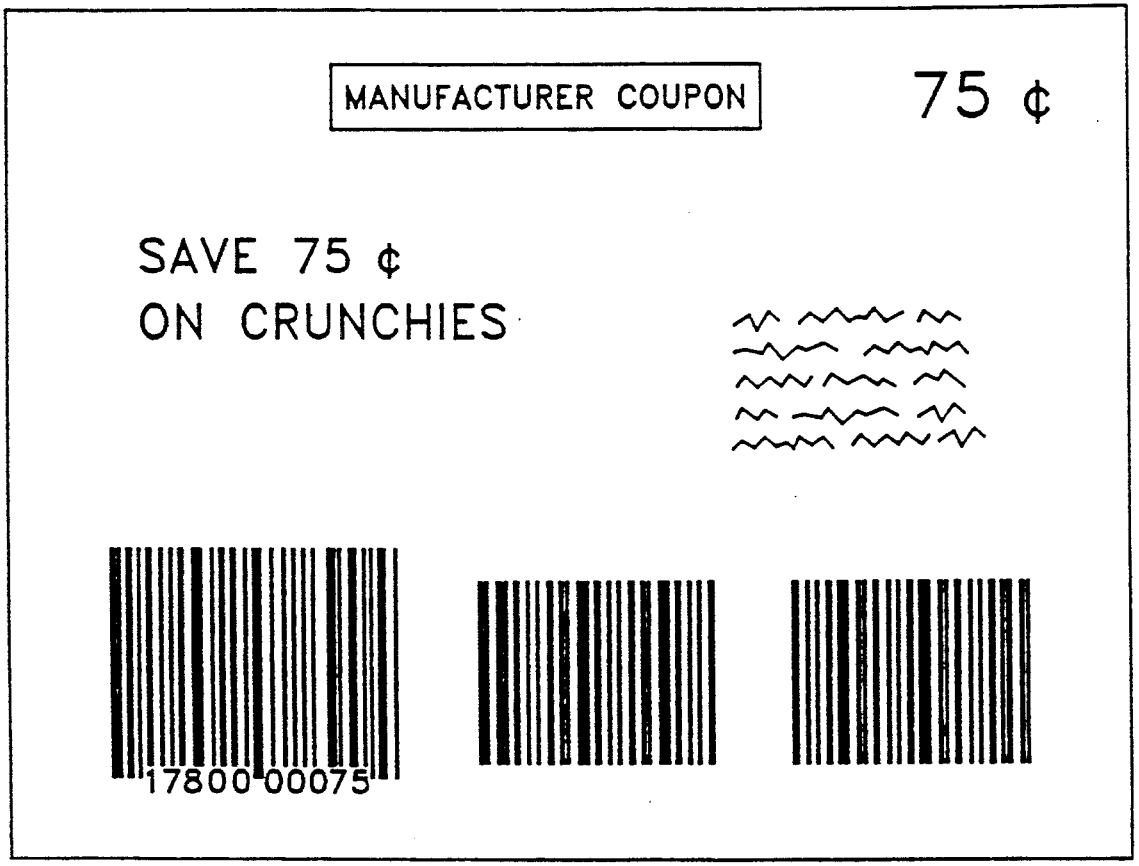
FIG. 13 is a view showing a proposed new ∫Code 128" bar code extension/for additional data.

FIG. 13 shows the proposed "Code 128" bar code extension for use with coupons. This has been proposed by the Joint Industry Task Force as a supplemental code for additional data desirable to be included on coupons. The particular layout of these Code 128 extensions has not yet been standardized.

The following table identifies assignment of UPC symbols for this Code 128 supplement.

TABLE 2

| Proposed Add-On Bar Code Field Definitions | | |
|---|---|---|
| Field Position | Number of Characters | Definition |
| 1-5 | 5 | Marketing Information: free format. |
| 6-8 | 3 | Expiration month/year. Table that is good for 80 years. |
| 9-10 | 2 | "Open" |
| 11-18 | 8 | Household ID. |
| 19-20 | 2 | "Open" |

The integrated systems of the present invention described herein, in preferred embodiments, can include scanning optics for reading the extended Code 128 format bar codes.

Figure 3:
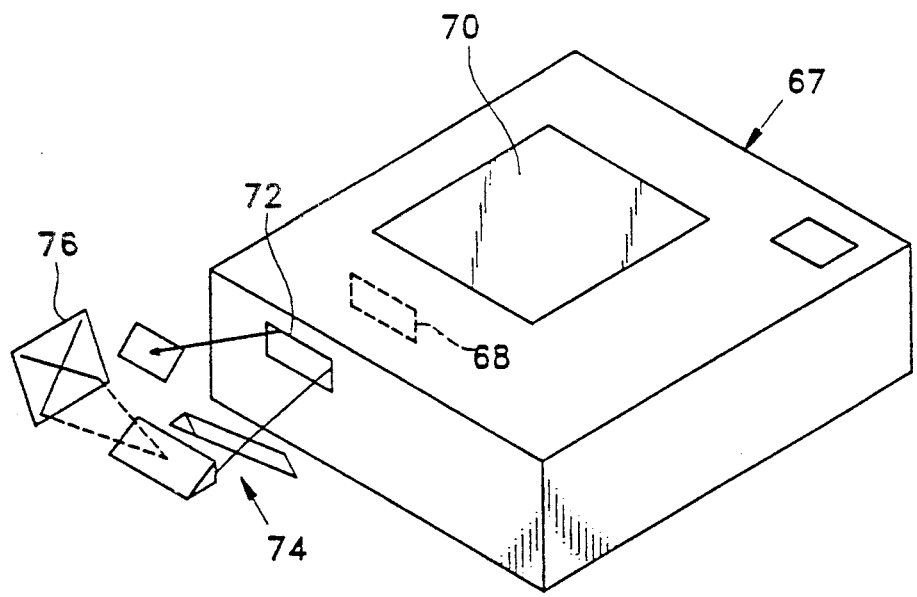
FIGS. 3 and 3A are schematic views in perspective, showing a counter top bar code reader and indicating two arrangements for interrupting a bar code reading beam to divert it from a normal product scan window and to form a coupon reading scan pattern at another location.

FIG. 3 shows schematically a POS scanner 67 which may be modified to produce a diverted beam and separate redemption coupon scan at a different location, in accordance with the invention. The scanner 67 may comprise, for example, the Spectra-Physics "Freedom Scanner", which is a scanner having low-profile scanning optics.

As shown schematically in FIG. 3, the scanner 67 includes a horizontal scan generating mirror 68, as part of the normal scanning optics for producing a scan pattern at the normal beam exit window 70.

In a system of this invention, the horizontal scan generating mirror 68 (or another mirror or a holographic scan element, on a different type of scanner) becomes a movable mirror which will shift in position under the influence of a motor or solenoid to allow the scanning beam to exit the scanner 67 through a coupon reading beam exit window 72. The mirror 68 can be moved out of the way of the beam entirely or it can be reoriented to a different angle appropriate for diverting the beam through the coupon reading exit window 72.

When the beam is being diverted out the exit window 72, it is directed by appropriate scanning optics indicated generally at 74, so as to produce a coupon reading scan pattern 76. FIG. 3 shows a cross pattern 76 as an example for coupon scanning. The multiple scan line geometry eliminates or reduces the need for the operator to orient the coupon.

Figure 3A:
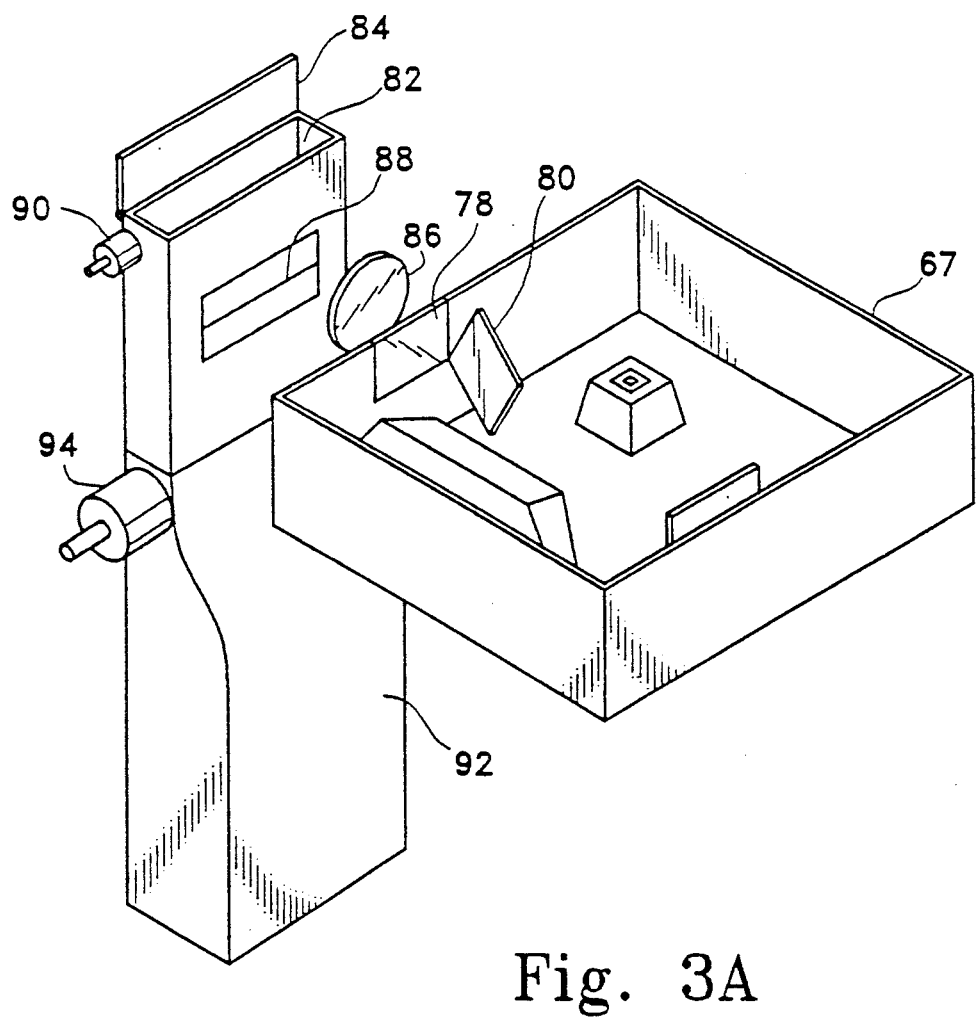

FIG. 3A shows schematically another form of coupon reader in conjunction with a beam scanner 67, again with the reading beam being diverted through a coupon reading exit window 78 when a coupon is to be read. Again, the scanner 67 can comprise, for example, the Spectra-Physics "Freedom Scanner". A mirror 80 which forms a part of the normal label reading scanning optics is movable to enable the beam to be diverted through the exit window 78.

In this embodiment, there is shown a coupon entry slot or channel 82, with a coupon entry door 84. When the coupon door 84 is opened, this signifies that a coupon is to be read, and causes the scanner mirror 80 to be moved so as to divert the scanning beam through the exit window 78 and through an auxiliary lens 86 to form a scan line 88. The scan line 88 is projected into the interior of the coupon channel or slot 82, where the coupon's bar code will be read as it passes by the scan line 88. Preferably, the slot 82 is configured so as to orient the coupon properly for its bar code to be read in a single pass by the scan line 88. A driven transport roller 90 is indicated in FIG. 3A, as moving the coupon at a prescribed speed past the scan line 88, activated by opening of the coupon entry door 84.

As also shown in FIG. 3A, there is a coupon disposal secure container 92 into which redemption coupons are deposited once read and validated. In the event the scanning of the coupon's bar code indicates that it is not valid for this particular transaction, the transport roller will be reversed to send the coupon back up and out of the slot 82. If the coupon is found valid, on the other hand, the transport roller can send the coupon on down toward the inaccessible coupon container 92. There may be included a coupon mutilating roller 94 en route to the container 92, providing further security against re-use of a validated redemption coupon.

Figure 3B:
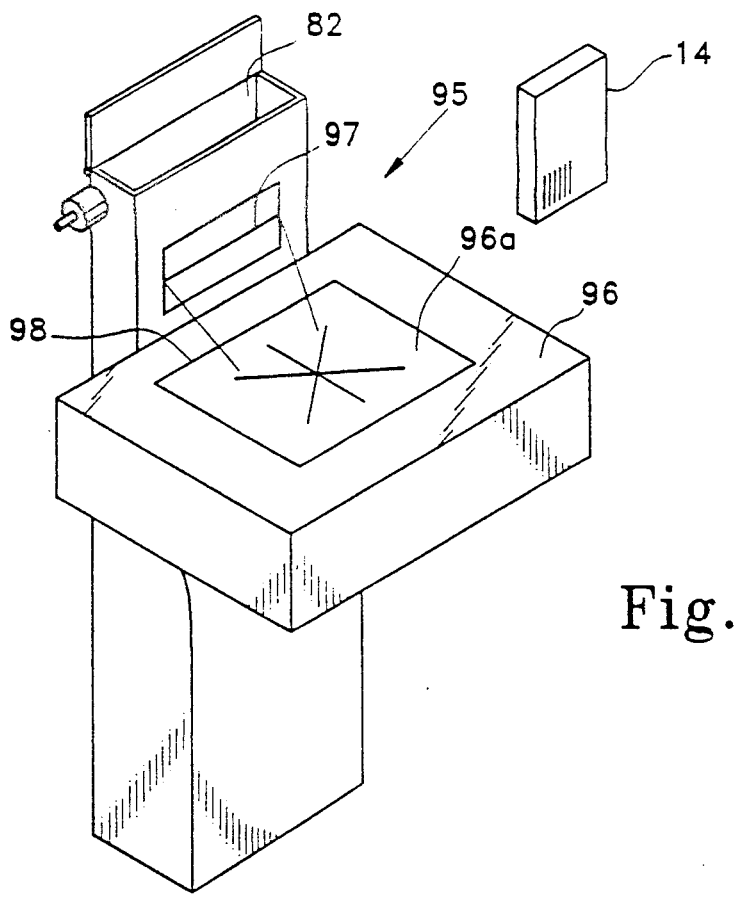
FIG. 3B is a simplified schematic view in perspective similar to FIG. 3A, and showing a variation of the embodiment shown in FIG. 3A.

FIG. 3B shows a variation of the system of FIG. 3A. In an item and coupon scanner 95 of FIG. 3B, a POS scanner 96 which normally projects a set of scan lines through a scanner window 96a, with beam waist generally at the window, there are provided optics for projecting an additional scan line 97 outwardly through the window 96a to a location where the scan line 97 can read coupons fed through a coupon receiving slot 82. It is important that the beam producing the coupon reading scan line 97 be sufficiently close to a far edge 98 of the window that plenty of area remains for scanning of grocery items 14. It is also important that the optics of the scanner 96 provide for the occurrence of the beam waist of the coupon scan line 97 to be substantially at the coupon reading location, rather than at the point this beam exits the scanner window 96a. In this embodiment, no switching or change of mode of the beam optics of the POS scanner 96 are needed.

Figure 4:
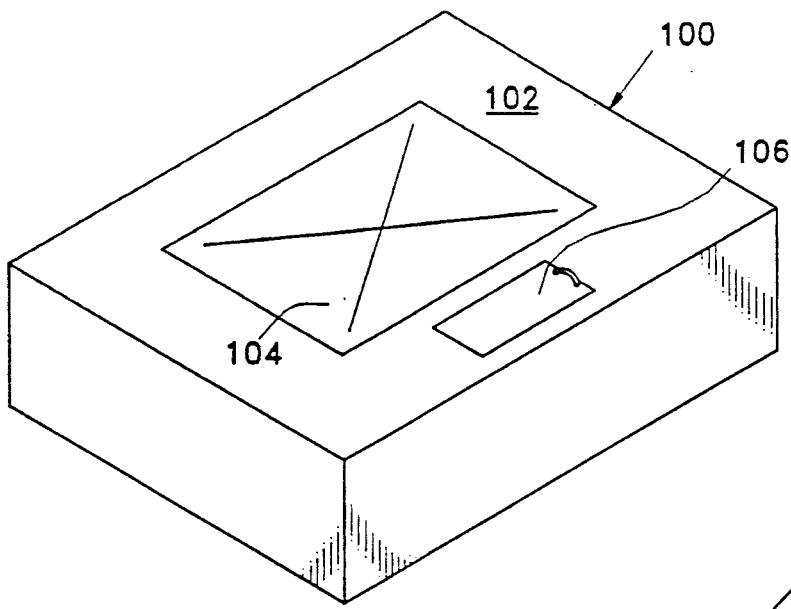
FIGS. 4 and 4A are perspective views showing a counter top with a product bar code reader and a separate door in the counter top for coupons, as in the embodiment of FIGS. 1 and 3.
Figure 4A:
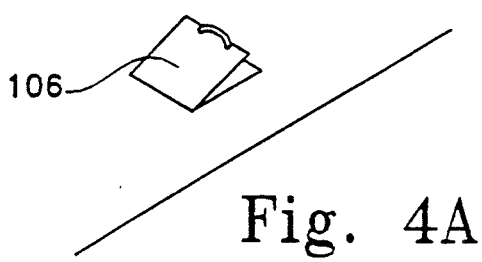
Figure 5:
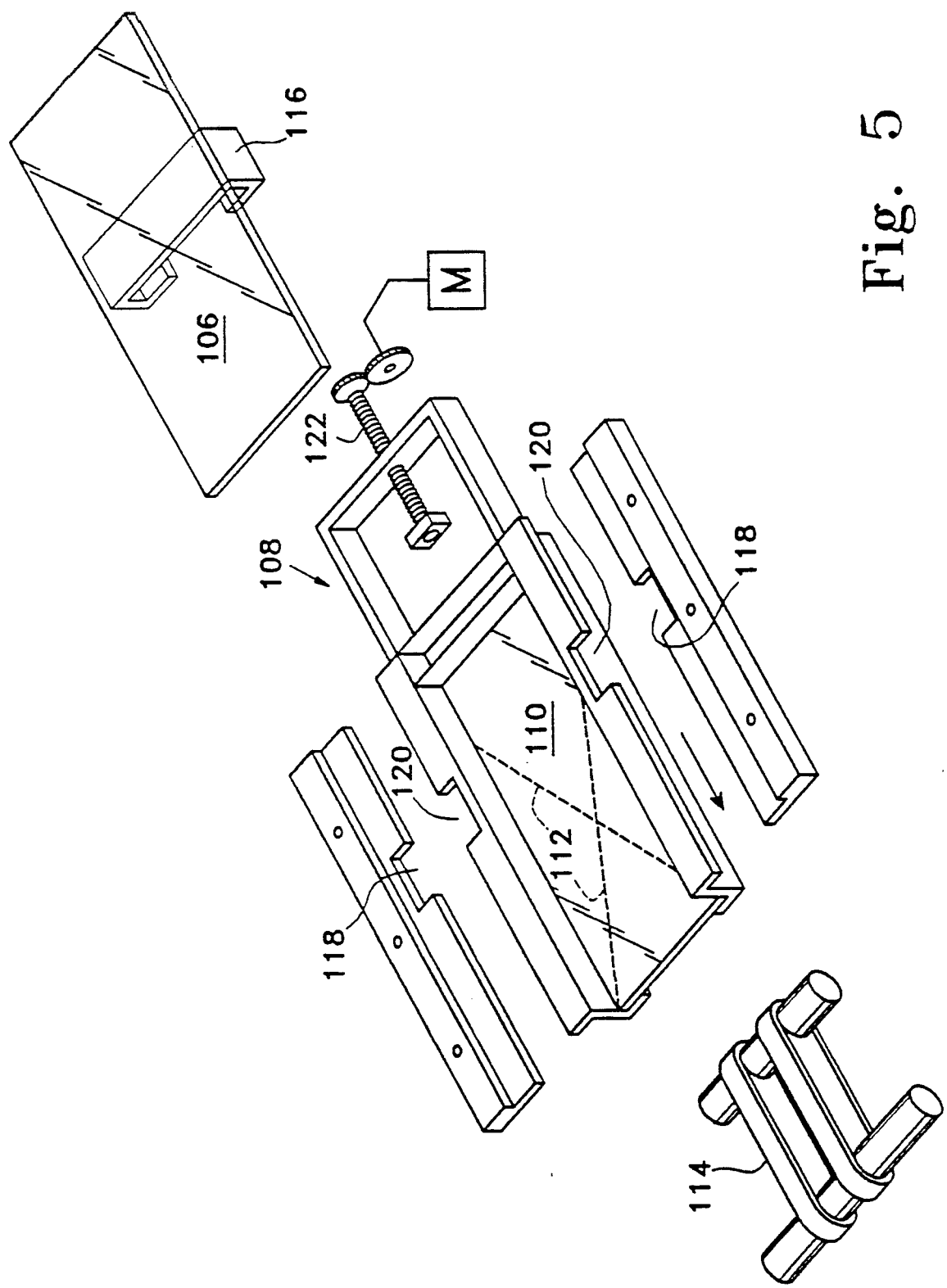
FIG. 5 is a schematic perspective view, exploded, showing one embodiment of a coupon reading and handling apparatus, such as may be used in conjunction with the coupon door shown in FIGS. 4 and 4A.

FIGS. 4, 4A and 5 show variations to the embodiments discussed with respect to FIG. 3 and 3A. In the label scanner and redemption coupon reader 100 of FIGS. 4 4A and 5, the counter top 102 has a normal product label scanner window 104, and a coupon door 106 which is opened (FIG. 4A) to insert a redemption coupon to be read.

As in the other embodiments, the customer's goods are first scanned using the product scanner 104. When a coupon is presented, the clerk or check-out person opens the coupon door 106, which may be a small door of glass, or having a transparent window, for revealing the coupon under the closed door. The operator takes the redemption coupon, opens the door 106 and places the coupon on a platform or stage 108 under the counter. The stage 108 has a glass bottom 110 so that scan lines 112 from below will be directed onto the face-down coupon.

When the door 106 is closed, this closure activates a motor M which slides the platform or stage 108 in a direction (to the left as viewed in FIG. 5) to advance the coupon over the scanning beam 112, which is also activated by closure of the door 106.

If the coupon is valid for this transaction, the motor advances the stage 108 further until a belt 114 or a vacuum pulls the coupon off the stage and disposes of it, either by storing it for future reference and disposal or by destroying it, such as by shredding.

If, on the other hand, an invalid label is read or no label is read after the door is closed, the stage 108 reverses its direction and returns to its original position which allows the door to be opened. The operator can see through the glass door 106 that the coupon has not been removed. The operator can then return the coupon to the customer.

FIG. 5 indicates a means for locking the door 106 when the stage 108 is moving and an attempt is being made to read a coupon. The door 106 may have a pair of downwardly extending locking flanges 116 which pass through notches 118 in fixed rails secured to the counter top. These locking flanges 116 will also pass through corresponding notches 120 in the movable stage 108, when the stage is in its initial position. However, when the stage is advanced to read a coupon, the stage notches 120 will be displaced from the locking flanges 116, and the door will be prevented from opening until the stage again returns to the initial position.

Thus, the structural arrangement shown in FIG. 5 prevents an operator from removing the coupon except at the proper time. The coupon advancing and reading structure is of shallow design so that it does not require much depth in the counter. The movement of the stage gives maximum scanning capability, so that the scan lines 12 sweep the entire coupon to find a bar code located anywhere on the coupon.

FIG. 5 shows the movement accomplished with a stepper motor M, appropriate gearing and a lead screw 122, but other appropriate mechanisms can be employed. It should also be understood that a button or switch can be provided for manual activation of the coupon scanning and recording function, rather than having this function triggered by opening and/or closing of the door 106.

Figure 6:
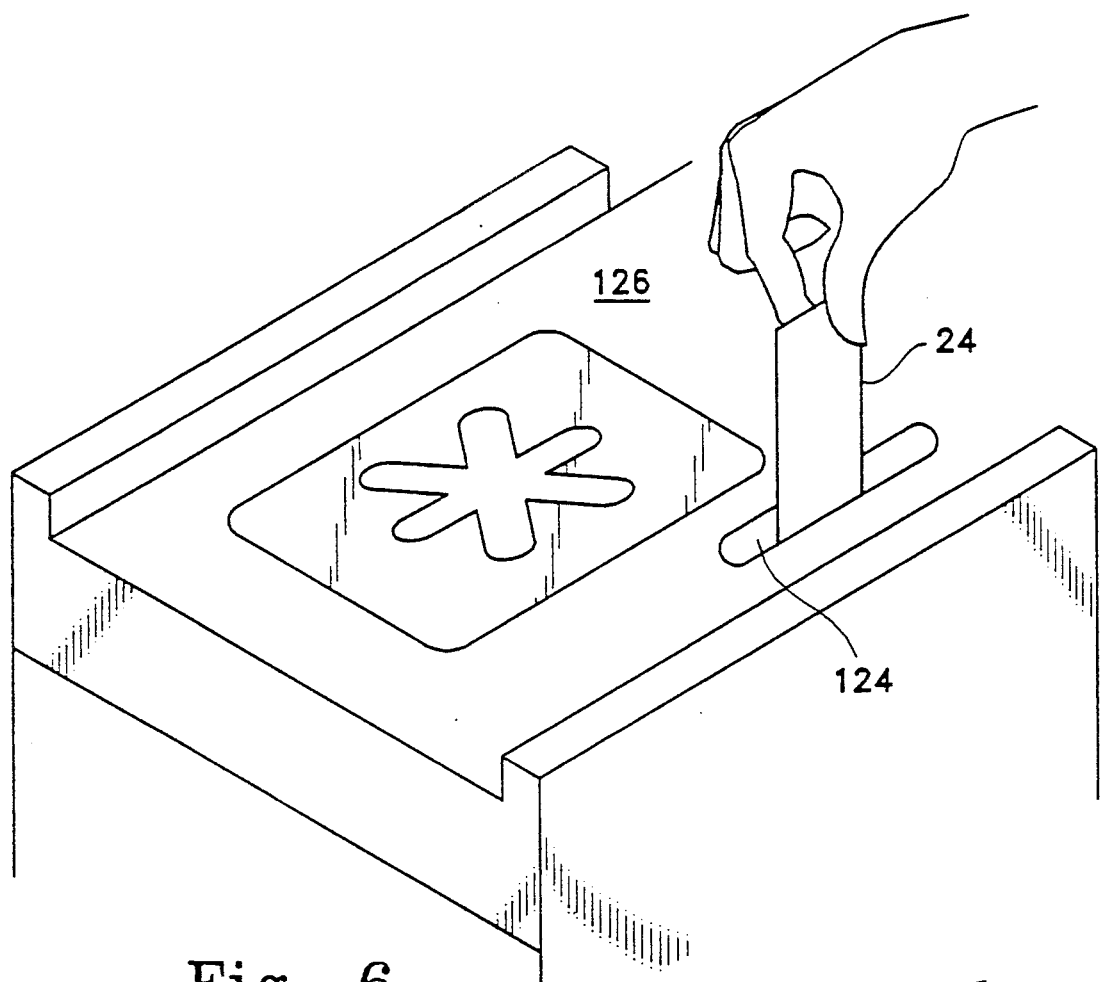
FIG. 6 is a schematic perspective view showing another form of coupon receiving and reading apparatus in conjunction with a counter top bar code reader, again corresponding to the embodiment of FIG. 1.
Figure 7:
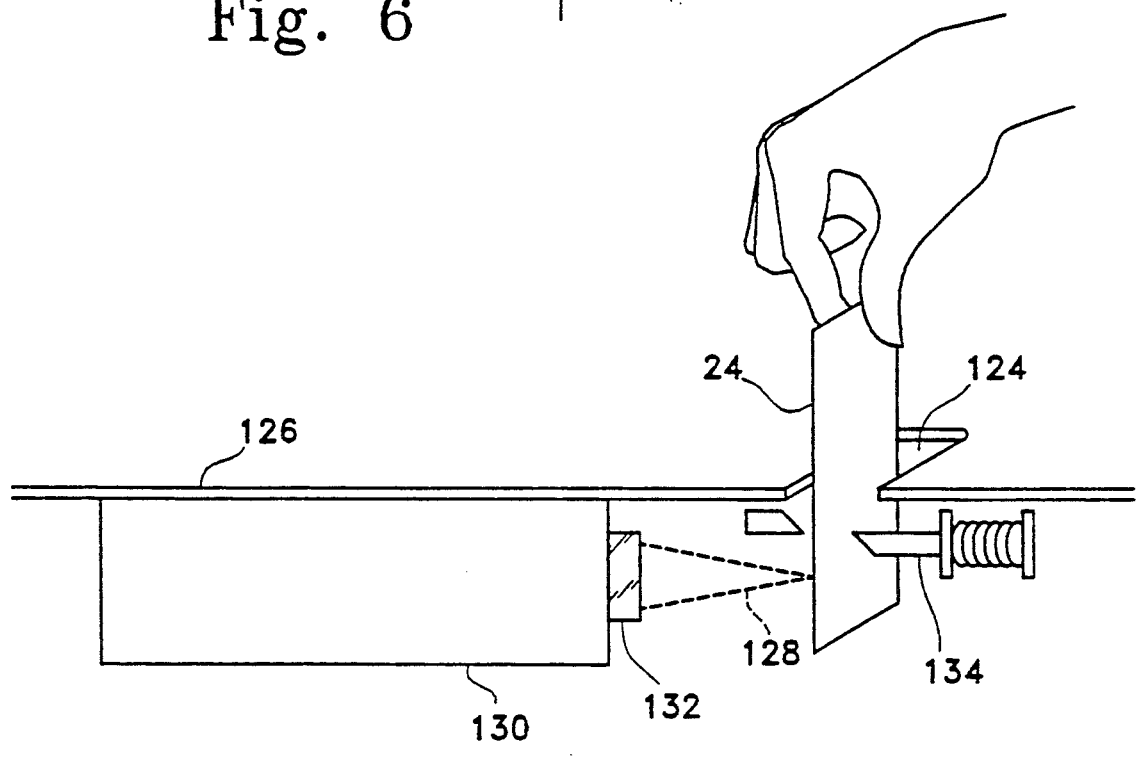
FIG. 7 is a sectional elevation view, partially in perspective, showing the system of FIG. 6.

FIG. 6 and 7 show another variation to the invention, with regard to the manner in which a redemption coupon 24 is placed in the system and read. A relatively long slot (which may be about six inches long) 124 is provided in the counter top 126 to allow the checker to draw a coupon 24 through by its edge as shown in FIG. 6.

Below the counter top, as indicated schematically in FIG. 7, is a diverted scanning beam 128 from the product scanner 130. The beam 128 has been diverted to exit the scanner 130 through a window 132, and this is accomplished preferably by a moving mirror as explained above with reference to FIGS. 3 and 3A. The window 132 is sealed so as to prevent paper dust and other dirt and debris from entering the scanner.

The motion of pulling the coupon 24 through the slot 124 is reminiscent of the motions of normal scanning of consumer goods by the checker. The system of FIGS. 6 and 7 may be activated by opening a door of the slot (such as a lightweight door which pushes open by insertion of a coupon), or by a separate switch (not shown).

When the coupon 24 has been validated using the scanning beam 128 and the decode logic of the scanner 130, an electronically controlled knife or scissors 134 preferably cuts the coupon 24 off just below the counter, cancelling the coupon and making it invalid for future use. The cut off portion of the coupon may simply fall into a wastebasket below the counter. The cutting knife or scissors 134 is far enough from the beam exit window 132 that any debris from the cutting of the coupon does not collect on the window 132. Alternatively the cancelling device 134 can simply comprise an ink applicator to physically mark the coupon and indicate its cancellation. Preferably the applied ink affects the coupon's bar code to prevent its being read again.

The system of FIG. 7 can effect the immediate cancellation of the coupon upon its being determined valid and redeemable. If this is done by ink cancellation, for example, the operator can simply retrieve the cancelled coupon and then dispose of the coupon or place it in storage for auditing if desired.

Figure 8:
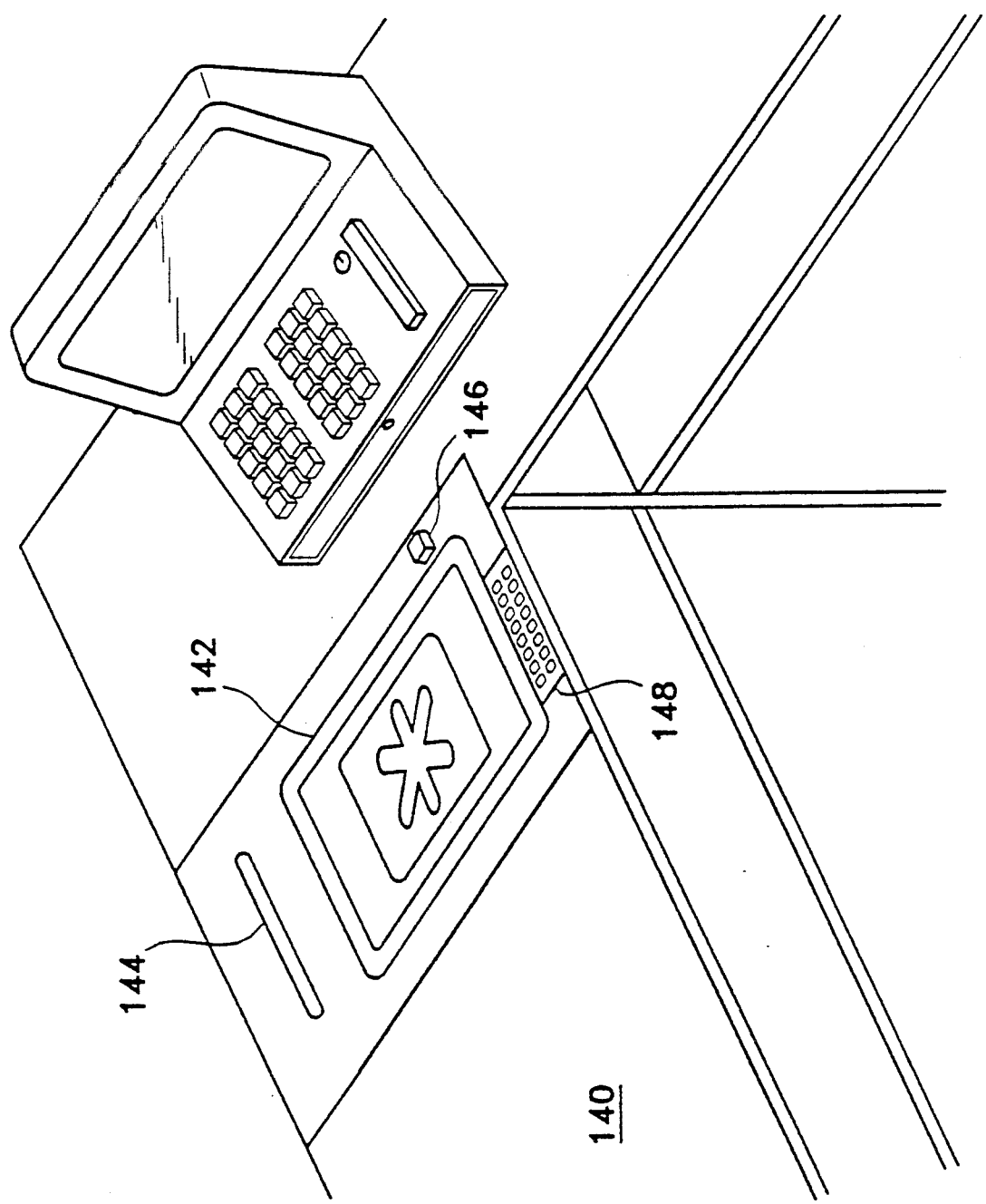
FIG. 8 is a perspective view showing a retail point of sale counter situation incorporating coupon reading into a POS scanner.
Figure 9:
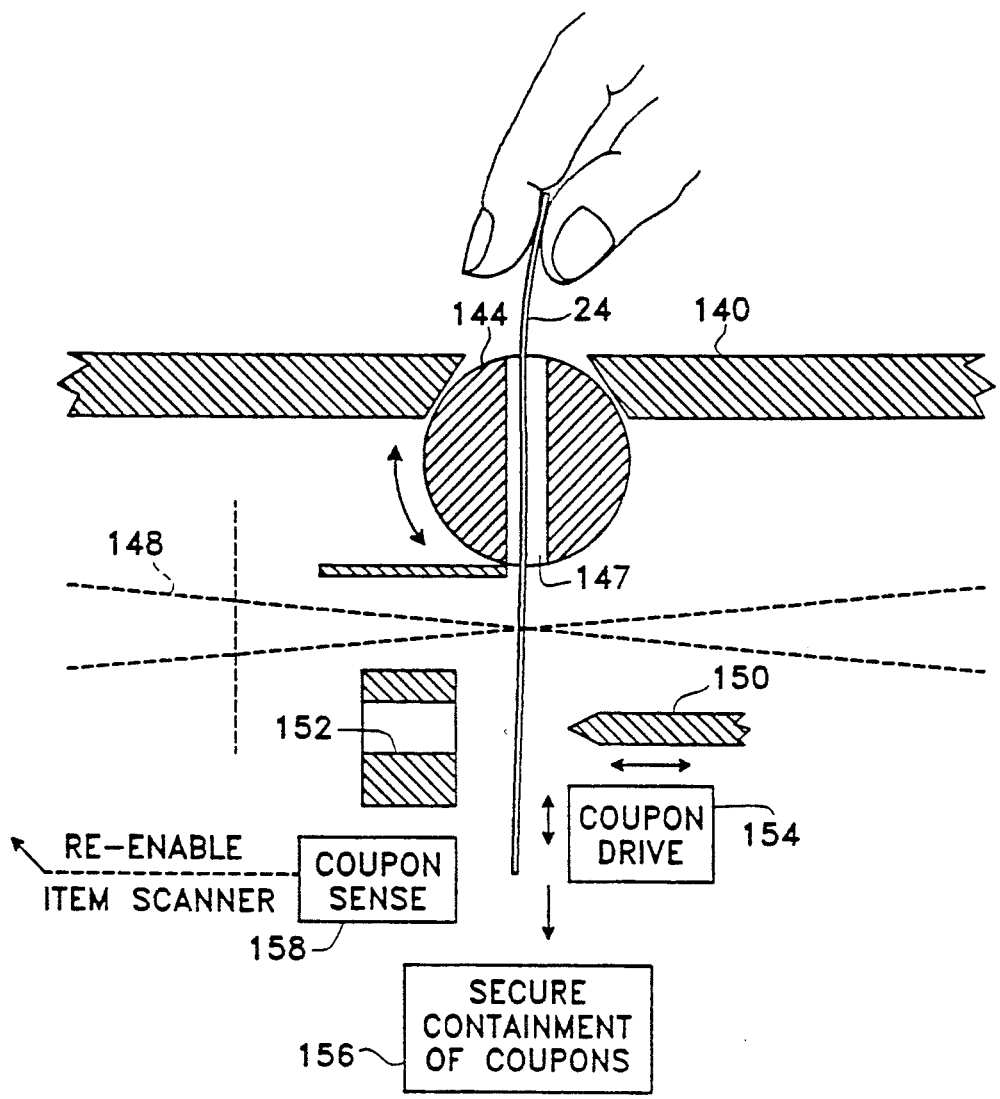
FIG. 9 is a sectional elevation view showing a part of the system of FIG. 8.
Figure 10:
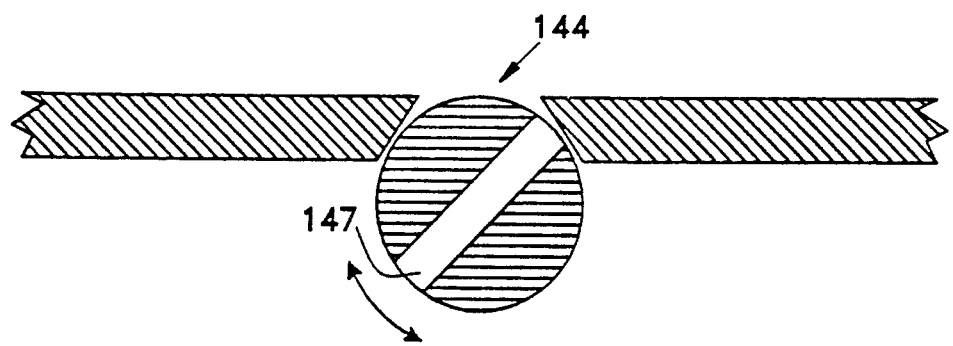
FIG. 10 is a view similar to a portion of FIG. 9, but showing a different position of a coupon receiving slot.

FIGS. 8 through 10 show another embodiment of an integrated POS scanner and coupon reading system of the invention. In FIG. 8 a counter top 140 is shown with a POS scanner 142 whose top is substantially flush with the counter. This arrangement is somewhat similar to what is shown in FIGS. 6 and 7, with some differences. The embodiment of FIGS. 8 to 10 includes a form of coupon door 144 which differs from those shown previously and which may be operated by a button 146 within the control of the check-out operator. Although the door 144 is shown at the remote side of the scanner 142 in FIG. 8, it is generally preferable to locate it closer to the operator, such as between the keyboard and the scanner.

In addition, FIG. 8 indicates schematically a flat, substantially flush small keyboard 148 which may be included with the POS scanner 142, in the counter top. The purpose of the small keyboard 148 is to manually key-in data from a product or from a coupon, in the event the checker cannot get a good read from the purchase item bar code and, in the case of a coupon, if he is given the power to override the coupon reading system in the event of error (or change in policy with respect to a particular type of coupon). The small override keyboard 148 is connected directly into the POS scanner 142 and enters the manually keyed-in data to be handled by the scanner system in the same manner as if the bar code were correctly read. Direct entry at the scanner enables the operator to make the key-in without turning to the cash register, and more importantly, where coupon validation is not in the cash register this allows the keyboard to communicate directly to the POS system, eliminating potential delay or errors. The manual key-in option, in the case of bad scans, will be discussed further below with reference to the flow charts of FIGS. 14 and 15A-15E.

FIGS. 9 and 10 show the operation of the door 144 of FIG. 8, and other elements of a system in accordance with this embodiment of the invention. In FIG. 9 a coupon 24 is being moved through the door mechanism 144, which comprises in this embodiment a rotatable cylindrical member with a through slot 147. The cylindrical member is rotated via a motor (not shown) activated by the button 146 shown in FIG. 8. It is sealed against the counter 140 in a water tight seal at both sides.

FIG. 10 shows the coupon door 144 in the closed position, with the slot 147 rotated to a position wherein the door is sealed closed.

A reading beam 148, which preferably is diverted from the POS scanner 142 as in the above embodiments, is scanned across the bar code of the coupon 24 through a sealed window as shown. This, in conjunction with the sealed door member 144, prevents moisture and debris from entering the POS scanner mechanism and electronics.

The coupon scanner of this embodiment preferably requires a sweeping motion of the coupon, as described in the embodiment of FIGS. 6 and 7. Alternatively, the beam scan can occur at an appropriate rate to pick up the coupon's bar code as it is moved vertically down through the slot 147.

FIG. 9 also shows a perforating punch or inking device 150 which may be used to cancel and invalidate against any future use all coupons which have been validated by the scanning system. The perforating punch can work in conjunction with a receiving aperture 152, as shown. Once a coupon has been validated and cancelled by punching, inking or other physical cancellation, a coupon drive device 154 may engage the coupon and move it into a secure container 156.

However, if the coupon is not found valid by the scanning and reading procedure, the coupon will not be punched and the coupon drive 154 will be signalled by the logic system to engage the coupon and push it back upwardly through the door slot 147, in position to be retrieved by the operator.

FIG. 9 also shows a coupon sensor 158 which senses that the coupon has gone beyond the point of retrieval and will inevitably be delivered into the secure container 156. Once this is sensed, the coupon sensor 158 can send a signal to the POS item scanner to reenable the item scanning function, assuming no further coupons are presented within a selected period of time.

In the system generally as shown in FIG. 9 the coupon drive 154 and the secure container may optionally be eliminated. If cancellation by inking, punching or other mutilation occurs immediately on validation, re-use will be prevented and the coupon can simply be retrieved by the operator after some indication of the validation and cancellation. Such a system is simple, with few moving parts. If desired the coupon drive can operate to pull the coupon down somewhat on insertion, then to push it back out for retrieval by the operator after handling by the system (whether valid or not).

Figure 11:
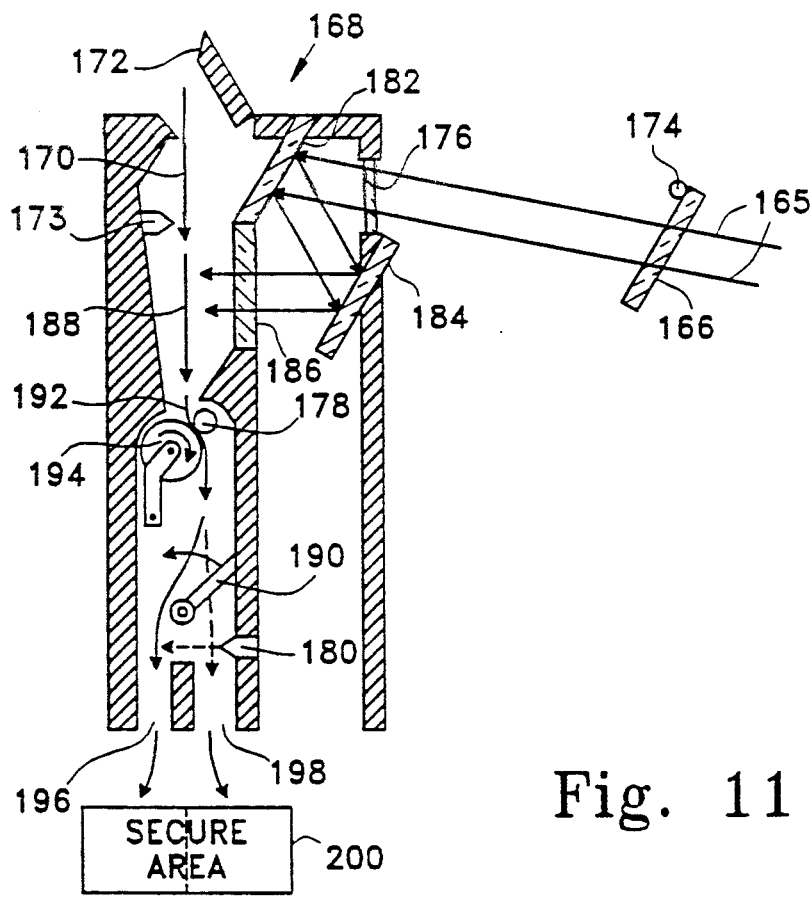
FIG. 11 is a sectional side elevation view showing another preferred embodiment of the invention, relative to coupon handling through a door.

Another embodiment of a coupon scanner, as integrated with a POS item scanner in accordance with the invention, is shown in the side elevation sectional view of FIG. 11.

The system of FIG. 11 is integrated to an in-counter, multi-directional POS scanner, a scan beam 165 of which is shown in the drawing. The drawing also shows a POS scanner mirror 166 which will normally reflect the beam scans 165 through a path which will generate the POS scan lines, but which can be moved when coupon scanning is to take place.

The coupon scanner (generally identified by the reference numeral 168) preferably is positioned at the side nearest to and parallel with the laser tube in a POS scanner such as the Spectra-Physics Freedom Scanner, although it could be used with any high performance slot scanner provided it is positioned for efficient use of the scanning laser beam of the POS scanner. The coupon scanner device 168 is integrated to such a POS scanner by adding it to the side of the scanner, modified as described in order to allow the laser beam to pass through.

In normal operation the check-out clerk or operator scans items for purchase in the normal way by passing them across a POS scanner window (not shown) through a dense array of laser beam scan lines, which may be generated from the beams 165 shown in FIG. 11. When a coupon (or other bar coded document redeemable for value) is presented, the check-out clerk places the coupon in the device at the position 170, which may be by pushing the coupon through a hinged door 172 which triggers a sensor 173 positioned somewhat below the door (this is the "C.ENTER" sensor as discussed below.

The sensor 173 activates a DC motor 174 which moves the POS scanner mirror 166 upwardly, allowing the laser beams 165 to pass through to the attached and integrated coupon scanning device 168. The beams pass through an opening or window 176 at the side of the coupon scanner 168.

At this point, firmware or software of the system activates a DC motor and capstan 178, and a further sensor at 180 ("C.LEAVE") begins the mechanical process of securing the coupon and detecting that it has properly passed through the scanning device, as explained further below.

The laser beam or beams 165 are reflected off a first mirror 182, then a second mirror 184 and through a clear window 186, by which the coupon passes at a position 188. The clear window 186 is a part of a structural arrangement which completely seals the scanning system from dirt, debris and paper dust that could enter from the coupon travel area.

The mirrors 182 and 184 are positioned at angles such that the laser beams from the POS scanner are directed down and back within the height dimensions of the POS scanner, and also to add path length of approximately six to eight centimeters to the beams 165, in order to bring the waist of the laser beams into the proper focal length for reading bar codes. In other words, the travel distance of the beams is approximately the same in reaching the coupons as it is in reaching purchase items when the beams are not being diverted to the coupon scanner.

The coupon will be oriented by the operator such that the bar code on the coupon faces in the direction of the scanning laser beams, with the bars and spaces of the bar code roughly perpendicular to the surface of the POS scanner and such that they are crossed by the laser scanning means as the bar code passed the window 186 at position 188. The bar code on the coupon is "read" via the detection, signal processing and decoding hardware and software of the POS scanner based on the reflected laser light of the laser beams 165.

Additional firmware or software, using the digital architecture of the POS scanner, is added to control the validation input/output and other functions of the coupon scanner, as further indicated below. This is possible in most cases without the addition of further hardware except for hardware to provide analog to digital conversions from the sensors 173 and 180, DC motors 174 and 178 and a diverter mechanism 190. Additional EPROM or RAM may be used to expand the logic capabilities of the system, operating under the POS scanner operating system, as part of the integration of the two functions.

As the coupon is placed in the coupon scanning device by the push from an operator and gravity, and as it moves through positions 170 and 188, it will then be "secured" at a position 192 and mechanically moved through the device by engagement with the motor/capstan 178 and a cooperating pinch roller 194. The pinch roller 194 may be spring loaded to apply pressure to the capstan 178, causing it to rotate in complement to the capstan 178, and also allowing the clearance between the capstan and roller to expand and compensate for varying widths and media of coupons.

The logic of the POS scanner will determine when a valid bar code is read from a coupon, and the coupon will then be transported to one of two exits 196 and 198.

If an invalid coupon is entered or no bar code is read, the POS scanner logic will signal the motor/capstan 178 to be reversed, thereby rejecting and reversing the coupon's direction of movement, backing it up and out of the scanner.

If a valid coupon is read, the POS scanner then signals the diverting mechanism 190 to direct the coupon to the proper exit position (196 or 198) through which the coupon exits the coupon scanner. The sensor 180 detects, via reflected light, the passing of a coupon through the coupon scanner, thereby assuring a validated coupon has completed travel through the system.

The travel of an invalid coupon through this system, which may be due to a paper jam or invalid coupon size/media combination, or the absence of any signal for a valid coupon, which might be due to a paper jam or intentional holding and removal of a coupon by the operator, would be detected by the sensor 180 in conjunction with the firmware logic, causing a special error condition as explained further below. (This error could be signalled, for example, as a flagged field in an electronic transaction record.)

The diverting device 190 is shown as selecting one of several possible exits 196 or 198 (or possibly more). This represents a system for categorizing coupons as desired. Controlled by logic within the POS scanner logic, these diverters can include further downstream diverters in serial relationship, so as to provide a considerable number of exit locations. In this way, coupons can be categorized by manufacturer or product, or other bar coded documents redeemable for value, such as lottery tickets or food stamps, can be mechanically sorted based on the relationship between the bar code and logic contained in the POS scanner. A secure container 200 is shown schematically, optionally having several categorized departments, for receiving coupons exiting through the exits 196 and 198 of the coupon scanner and handling device.

Figure 14:
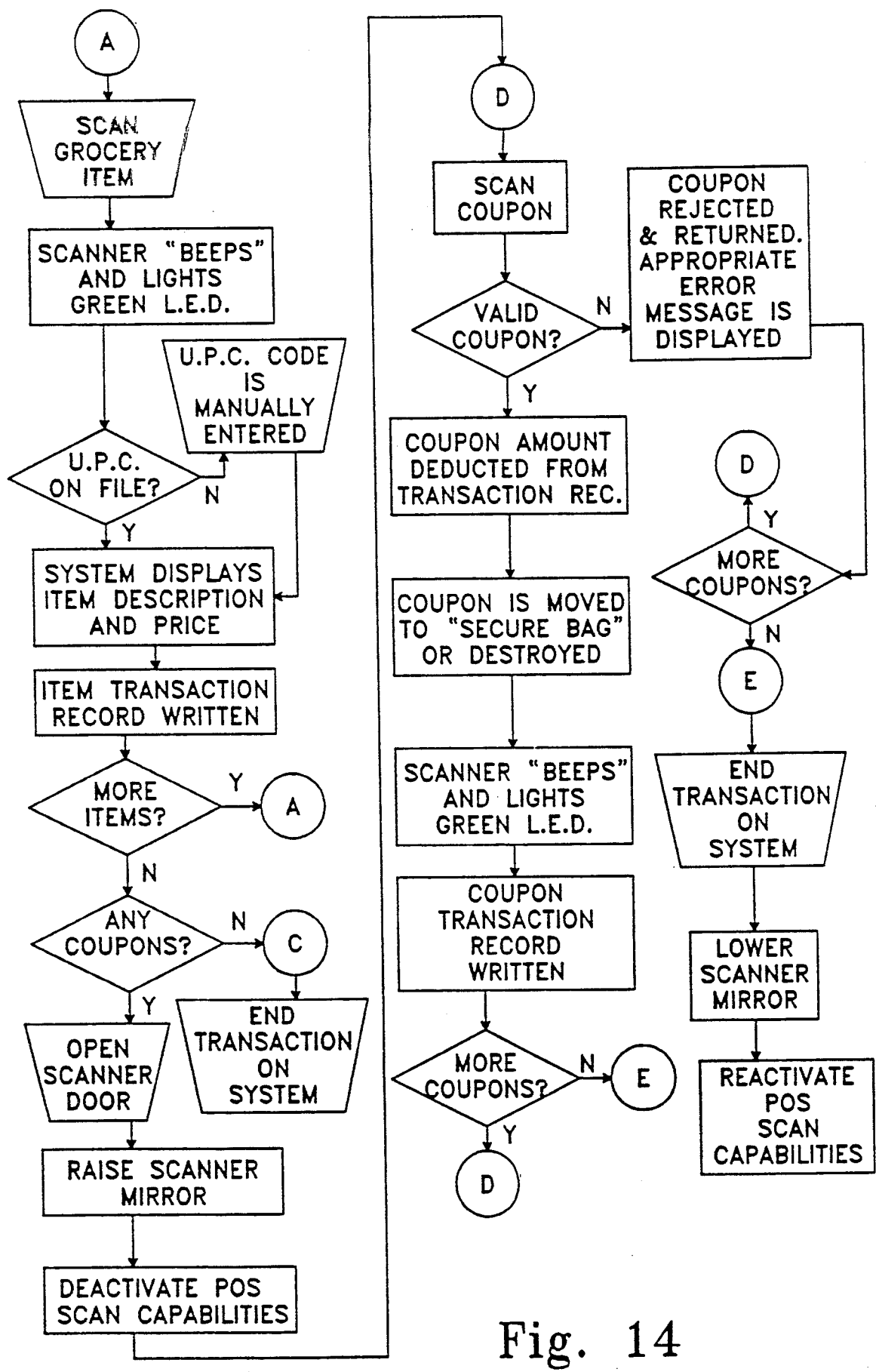
FIG. 14 is a simplified flow chart representing a system in accordance with the invention for product bar code reading and coupon reading.

FIG. 14 is a simplified flow chart diagram showing operation of an integrated POS scanner/coupon validation system in accordance with the invention.

In FIG. 14, the POS scanner is shown first scanning the bar codes of ordinary grocery items. In the absence of a readable bar code, the POS scanner may normally have activated a red indicator light. As shown in the diagram, when a readable bar code is passed by the POS scanner, the scanner "beeps" and activates a green indicator light, such as an LED. The system then checks to see if there is a UPC code corresponding to the read code on file in a data base. If not, the operator has an opportunity to enter the numbers and information corresponding to the bar code information manually, either on the cash register or on the scanner, in some embodiments of the present invention (see FIG. 8, showing a scanner keyboard).

Once the POS scanner has read the bar code, or the information has been entered manually, the system displays the item description and price (derived from a POS system database), usually on the cash register. An item transaction record is generated internally and stored in memory, and at the same time, ordinarily the transaction record, or a portion of the transaction record, will be printed on a cash register receipt which is being generated during the transaction. Next, if there are more purchased items to be scanned, the loop continues as indicated. If not, i.e. the last purchased item has been scanned, the question arises as to whether the customer has any redemption coupons to present. If not, as indicated in the flow chart, the transaction is ended. If there are coupons, the scanner door is opened, which preferably has the effect of automatically raising a scanner mirror in the POS scanner, for redirecting the scanned beam to a position for reading coupons. At the same time this deactivates the POS scan capability of the system, in accordance with this preferred embodiment of the invention.

In the coupon scanning sequence, beginning at D in the flow chart, the coupon is scanned at the coupon scanning location. If the coupon is not valid and redeemable for this transaction, it is rejected, and an appropriate error message is displayed indicating that the coupon is not redeemable in this transaction, and the coupon is returned or rejected. If more coupons are then presented, the coupon scanning loop begins again. If no more coupons are presented, the transaction is ended, the scanner mirror is lowered into the normal POS scanning mode and POS scanning capability returned.

If a valid, redeemable coupon is read, the coupon amount may be automatically deducted from the record of the entire transaction, with this deduction shown on the register receipt.

It is important that the validated coupon be removed from the hands of the customer or operator. Once validated, it is automatically moved through the system to a "secure bag" or punched, mutilated or destroyed, preventing future use. When this has occurred, the scanner "beeps" and preferably activates a green light (LED) to indicate that the coupon has been validated and moved to the secure area. A coupon transaction record is written and stored in memory, and this may be substantially concurrently with the deduction of the coupon redemption amount from the total transaction.

If there are more coupons the system loops back to D, and if not, it goes to position E, i.e. the end of the transaction and the return to POS scanning mode.

In POS scanner and coupon validation systems in accordance with the invention, there are two important objectives to be accomplished when coupons are being validated:

1. Scanning of the data on the coupon, making of decisions and passing the coupon data to the coupon validation logic, which determines whether the coupon is properly redeemable. This is accomplished by the system's scanning the coupon, doing some simple tests on the coupon data and passing the data to the coupon validation logic. The coupon data ordinarily does not require any further system database lookup as does the completion of a purchase item transaction. The coupon validation logic must then signal the coupon scanning apparatus as to whether to move the coupon through the system (if redeemable) or return it to the operator (if not redeemable).

2. Securing of the validated coupon and assuring that the paper travels through the system to a secure area, so that the coupon cannot be removed and reused. It must be assured that the physical coupon is directly related to the validation process. This is accomplished in preferred embodiments through the use of two sets of sensors which are used to detect the proper movement of a piece of paper (coupon) in the system.

The expanded flow chart of FIGS. 15A-15E more completely describes the system and software flow, and should be considered along with the following logic signals truth table.

TABLE 3

| Truth Table for Logic Signals | | | |
|---|---|---|---|
| Coupon Enter | UPC5 Valid | Coupon Leave | Definition |
| 0 | 0 | 0 | Reset |
| 1 | 0 | 0 | Coupon has passed sensor (entered device). |
| 1 | 1 | 0 | Coupon has entered and scanned and validated by the |

TABLE 3-continued

| Truth Table for Logic Signals | | | |
|---|---|---|---|
| Coupon Enter | UPC5 Valid | Coupon Leave | Definition |
| | | | coupon validation logic s/w. |
| 1 | 1 | 1 | Valid coupon has travelled into device and is "secure" |
| 0 | 1 | 1 | Valid coupon moving correctly. |
| 0 | 1 | 0 | Ending state for valid and secure coupon. |
| 0 | 0 | 1 | Error: Invalid coupon has passed. |
| 1 | 0 | 1 | Invalid coupon: reverse capstan motor and eject coupon. |

The flow chart of FIGS. 15A-15E shows a sequence similar to that described with FIG. 14, but in greater detail and with further steps described in some cases. When the transaction begins, a beginning of transaction record is written. Grocery (or other retail) items are scanned in the normal manner as indicated. In the event a good scan is not obtained of an item, the operator has a choice of re-scanning the item or manually keying in the information on the product, as discussed previously. If this is done, the POS system then receives the information on the item, price and description as indicated, and the "coupon validation logic" receives the family code, indicating the item. If a good scan has occurred (meaning that a bar code was recognized and read by the system), this is indicated as shown in the flow chart and the UPC character string is sent to the POS system. The POS system then attempts to get the item description and price, and the "coupon validation logic" gets the family code if available. Next this information is checked, which may be in a central computer and data base, to be sure that there is a valid UPC on file for the label as read. If not, the system "beeps" and requires operator intervention. If the operator elects to override the system, he will manually key in the information, whereupon the POS system can display the item description and price. As indicated in the flow chart, if the system does find a valid UPC on file then the system automatically generates the item description and price and displays this information.

Next, the item transaction record is written and put in a buffer, and the record is sent to the "coupon validation logic".

If there are more items for purchase, the system loops back to the A point. If not, and if there are no coupons presented, the transaction is ended and a record written. If there are coupons presented, the coupon scanner door is opened, the coupon is entered and, as described above, the POS scanner mirror in a preferred embodiment is moved to reflect the scan beams properly into the coupon scanner area.

Figure 15A:
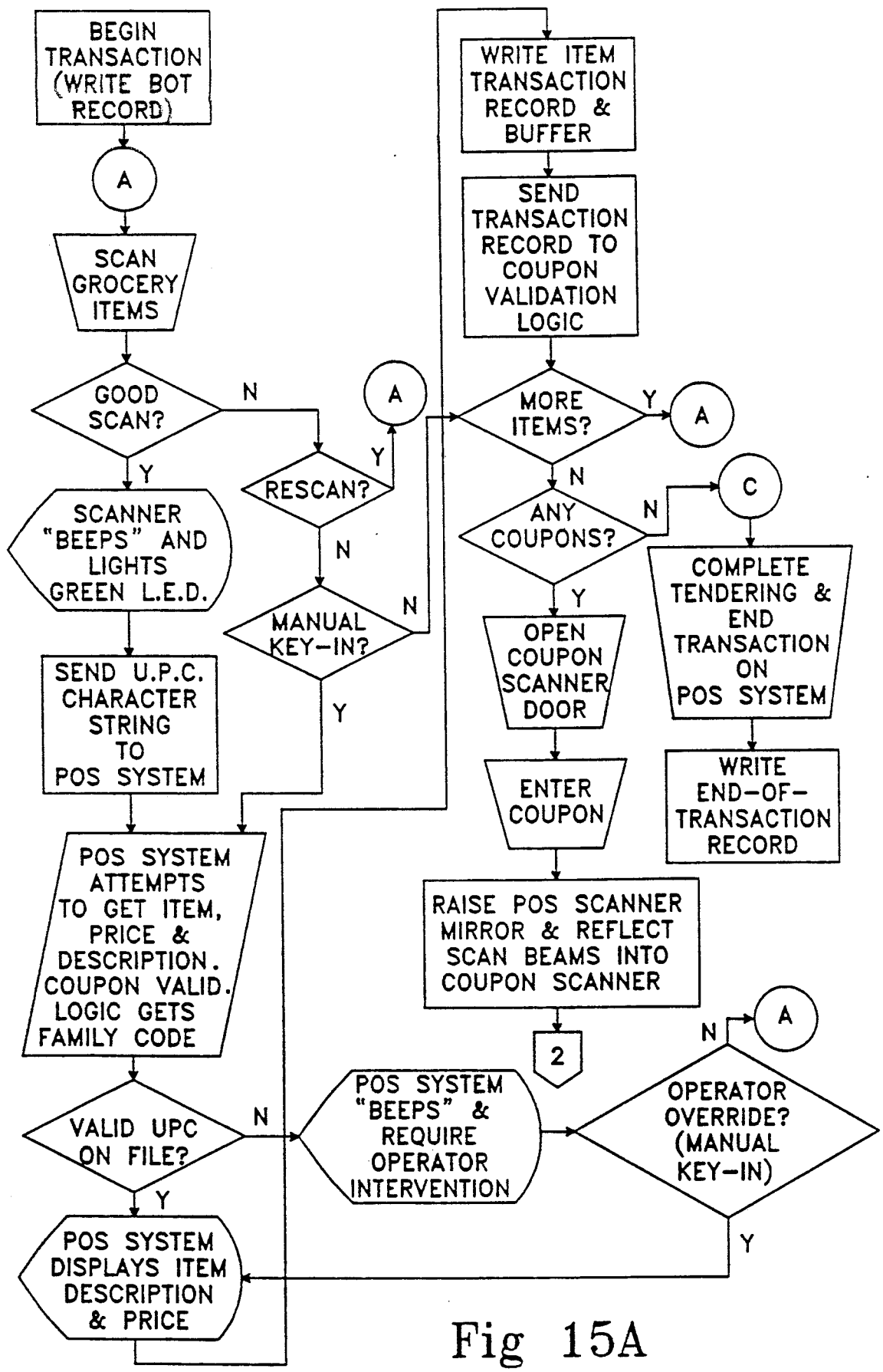
FIGS. 15A, 15B, 15C, 15D and 15E comprise an expanded flow chart diagram representing the system of the invention.
Figure 15B:
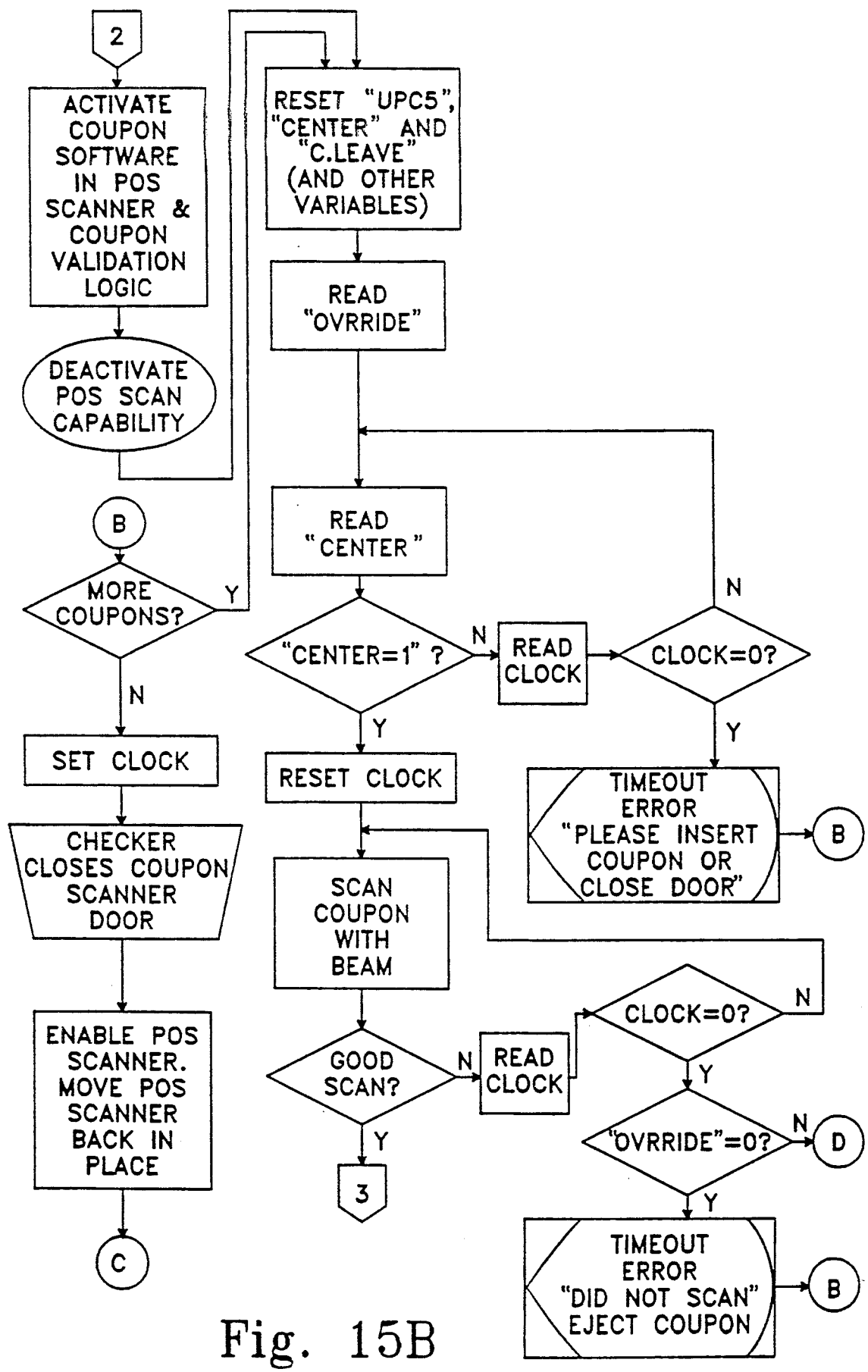
Figure 15C:
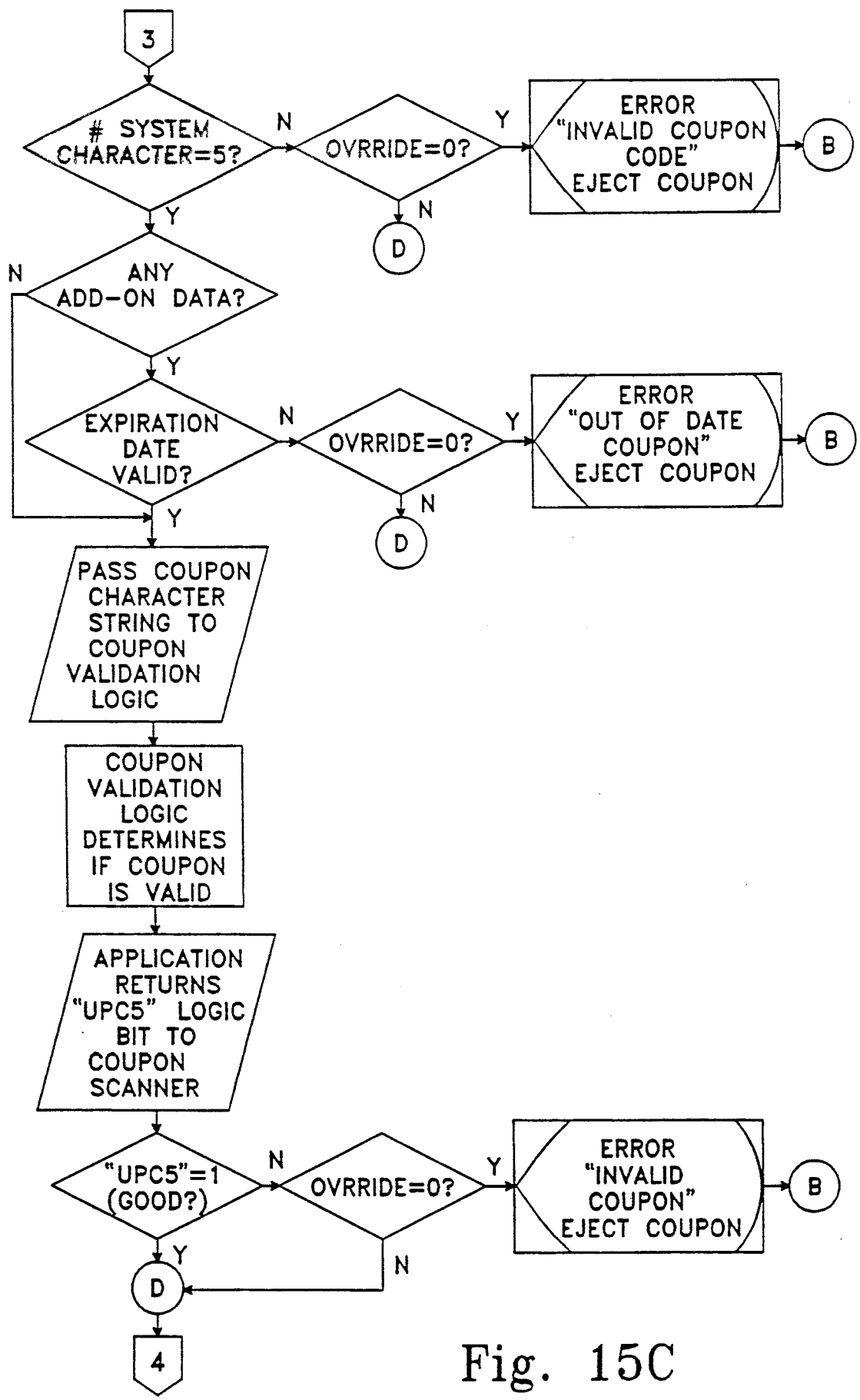

In preferred embodiments, the operator must open a door to start the coupon scanning system. This (or the opening and then closing of the door) may signal a motor to move the mirror which makes coupon scanning active in the coupon slot of the device, and also activates the coupon software and may deactivate the ability to scan other items in the POS mode, as indicated in FIG. 15B below the location "2". At this point, a repeating process begins which is used for all coupons. All "logic bits" (i.e. "UPC5", "C.ENTER", "C.LEAVE", "OVRRIDE", and "CLOCK") will be reset prior to entering each new coupon.

When a coupon is to be read, the operator places the coupon in the device. The system software checks to see whether the operator has chosen to manually override the system, as indicated in the box in the flow chart. If an override is in effect, the coupon validation logic will have sent a logic bit "1" to the device. This bit will be checked periodically to determine what to do.

Next the system reads the "C.ENTER" or "CENTER". This is the first sensor near the top of the coupon chute in the device (see FIG. 11). The system checks when (and whether) the coupon was entered into the device. A clock function is shown in the flow chart, representing a simple timing sequence to assure that excessive time does not occur before a beam is scanned. If the allowable clock time is exceeded, a message is displayed such as "please insert coupon or close door".

The coupon is scanned by the system as soon as it is available, as indicated in the flow chart. If the bar code is read correctly, then the data is buffered and a series of simple validation checks are performed as described below, preferably in the scanner device since the checks are simple and can be accomplished quickly. First, as indicated in the chart under the location "3" (FIG. 15C), the first character of the code is checked to be sure it is "5" (representing a coupon). If not, a signal is sent to the coupon validation logic that there is an error, and this is displayed as indicated in the flow chart.

Also, a check is preferably made for any additional data bar coded on the coupon, beyond the standard bar code (see FIG. 13, e.g.). That information can also be read by the scanner and passed to the coupon validation logic. (Certain variations, such as the inclusion of an expiration date in the coded data, can be handled by software in the device, as accomplished with the number system described above.)

The data is passed to the coupon validation logic, which will determine whether the coupon correlates to any of the items purchased. This can be accomplished in any of several locations—cash register software, controller software that runs the cash registers, or a separate device such as a PC computer attached to the network. It can also be in the POS scanner device itself. The important thing is that the correlation have access to the UPC number with family code and price.

As indicated in the flow chart, the coupon validation logic sends a logic bit back to the scanner device signalling one of two things: (1) the coupon is valid, therefore execute further logic to assure the coupon passes through the device to the secure area, or (2) the coupon is not valid, therefore reverse the motor and reject the coupon.

If the coupon is not "valid" or redeemable, the operator may still be given the power to override this manually, as indicated.

Figure 15D:
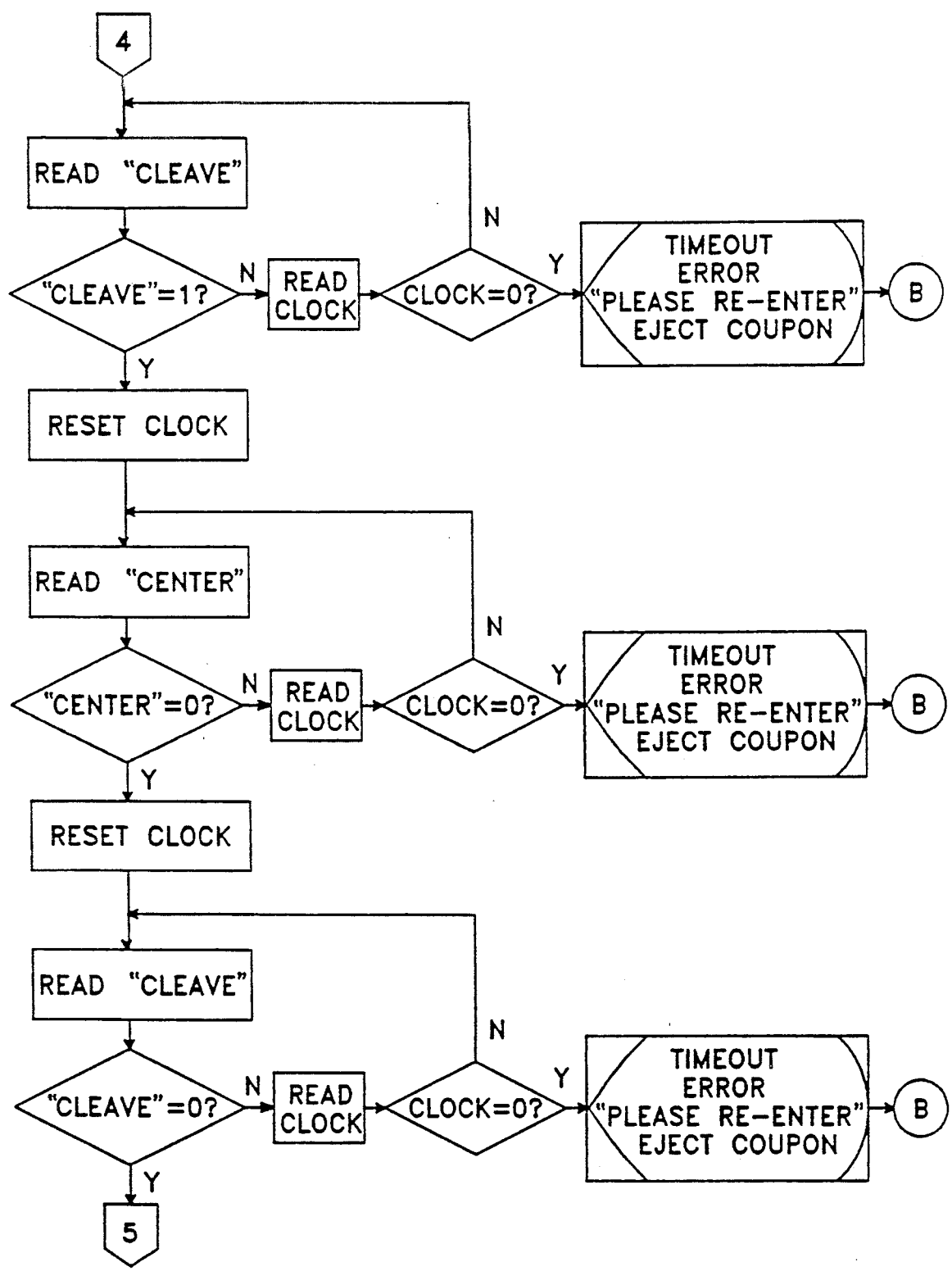
Figure 15E:
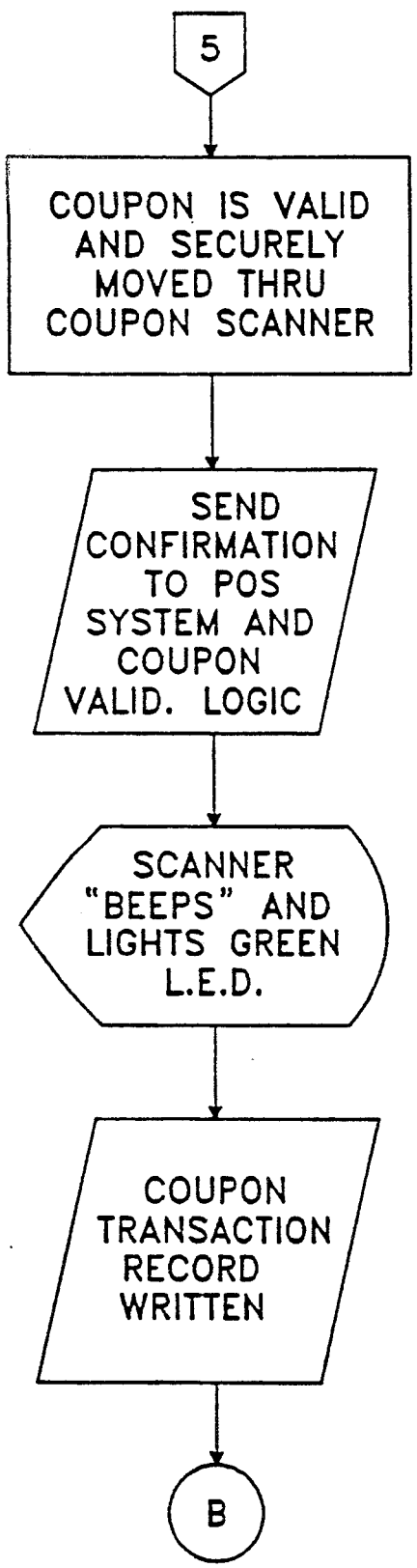

At location "4" in the flow chart, FIG. 15D, it is indicated that the coupon scanner system now reads "CLEAVE" to be sure that the coupon passed the second sensor (FIG. 11) in the pathway to the secure area, indicating correct travel through the device. See also Table 1, above. This is also subject to a clock loop as indicated, assuring that excessive time does not pass (as if the coupon is not properly moving through the system).

Next, the scanner system again reads "CENTER", after a clock reset, in order to assure that the coupon is not removed and it has passed properly through the system. The first sensor along the path should be reset (back to "0"), before CLEAVE transitions back to "0".

If this transition does not occur in this logical order, the conclusion is that the coupon was removed by the operator, or the system is jammed. A normal error condition message is displayed, and the device attempts to reject the coupon, as indicated in the flow chart.

Next, a signal is generated that the coupon is valid and has securely moved through the coupon scanner, as indicated under "5" in the flow chart. Confirmation is sent to the POS system and the coupon validation logic. The device then preferably indicates this by a "beep" and the activation of a green signal light, which can advantageously be the same signalling the operator receives when a purchase item is read. A coupon transaction record is written, and the system returns to the location "B", i.e. if there are more coupons it loops through the same procedure again and if not, the clock is set, the coupon scanner door is closed and the normal POS scanner is re-enabled.

The coupon transaction record includes all relevant information about the transaction, the UPC number of the item purchased and of the coupon, the amount of credit, the time of the transaction and other required data. The record is stored for later batch reconciliation, or it may be used in an on-line fashion for electronic clearing, wherein the manufacturer will be debited and the retailer will be credited. This electronic clearing or electronic data interchange system is advantageous in eliminating one or more levels of clearing in the usual coupon clearing system.

While we have illustrated and described the preferred embodiments of my invention, it is to be understood that these are capable of variation and modification and we therefore do not wish to be limited to the precise details set forth, but desire to avail ourselves of such changes and alterations as fall within the purview of the following claims.

We claim:

1. A point-of-scale bar code reader for retail stores, having a housing, a reading beam, scanning optics for producing scan lines with the reading beam, collection optics and bar code decoding software, and for reading and verifying the use of redemption coupons bearing bar codes, as well as reading items for purchase in a consumer transaction, comprising, redemption coupon receiving means associated with the housing of the bar code reader, coupon detection means for signifying in the decoding software that a redemption coupon is being read, as opposed to a purchased item, coupon reading means associated with the scanning optics of the bar code reader for scanning and reading a redemption coupon using the same reading beam used in the scanning optics, when a redemption coupon is placed at said redemption coupon receiving means, the coupon receiving means including a slot configured to receive a coupon, coupon sensing means at the slot, activation means for placing the bar code reader in a coupon reading mode when a coupon has been placed in the slot and sensed by the coupon sensing means, means for drawing the coupon through the slot for the coupon to be read, and associated means for interrupting a normal product reading scanning pattern generated by the scanning optics to divert a reading beam to the position of the redemption coupon, serving as said coupon reading means, means for decoding the redemption coupon's bar code using the same bar code decoding software used for purchased products, and correlation means for comparing the decoded information from a redemption coupon bar code with a list of purchases as determined from bar codes of purchased items in the same consumer transaction, and for determining whether the consumer should be credited in a redemption amount associated with the coupon, based on whether an appropriate qualified item has been purchased to qualify for coupon redemption.

2. A point-of-sale product and coupon bar code reader system for retail stores, including a product bar code reader having a housing, a reading beam, scanning optics for producing scan lines with the reading beam, collection optics and bar code decoding software, and for reading and verifying the use of redemption coupons bearing bar codes, as well as reading items for purchase in a consumer transaction, comprising, redemption coupon receiving means associated with the bar code reader, coupon detection means for signifying in the decoding software that a redemption coupon is being read, as opposed to a purchased item, coupon reading means connected to the bar code reader for scanning and reading a redemption coupon when a redemption coupon is placed at said redemption coupon receiving means, decode means for decoding the redemption coupon's bar code using the same bar code decoding software used for purchased products, correlation means for comparing the decoded information from a redemption coupon bar code with information representing purchases as determined from bar codes of purchased items in the same consumer transaction, and for determining whether the consumer should be credited in a redemption amount associated with the coupon, based on whether an appropriate qualified item has been purchased to qualify for coupon redemption, and the coupon reading means including movable door means providing an opening for insertion of a coupon, serving as said redemption coupon receiving means, beam diverting means for diverting the product bar code reader's reading beam to scan a coupon when it is placed through the coupon opening, and coupon securing means for engaging a coupon and delivering it into a secure area after the coupon has been determined to be valid and redeemable.

3. The system of claim 2, further including coupon cancellation means for making a physical indication of cancellation on the coupon after it has been determined to be valid and redeemable.

4. A point-of-sale product and coupon bar code reader system for retail stores, including a product bar code reader having a housing, a reading beam, scanning optics for producing scan lines with the reading beam, collection optics and bar code decoding software, and for reading and verifying the use of redemption coupons bearing bar codes, as well as reading items for purchase in a consumer transaction, comprising, redemption coupon receiving means associated with the bar code reader, coupon detection means for signifying to the decoding software that a redemption coupon is being read, as opposed to a purchased item, coupon reading means connected to the bar code reader for scanning and reading a redemption coupon when a redemption coupon is placed at said redemption coupon receiving means, decode means for decoding the redemption coupon's bar code using the same bar code decoding software used for purchased products, correlation means for comparing the decoded information from a redemption coupon bar code with information representing purchases as determined from bar codes of purchased items in the same consumer transaction, and for determining whether the consumer should be credited in a redemption amount associated with the coupon, based on whether an appropriate qualified item has been purchased to qualify for coupon redemption, and the redemption coupon receiving means comprising an openable door adjacent to the product bar code reader for receiving coupons entered by an operator, and wherein the coupon reading means comprises movable mirror means for diverting the reading beam of the product bar code reader to a coupon scanning location when a coupon is to be read, and further including isolation means for sealing the scanning optics of the product bar code reader from a path through which the coupon travels.

5. The system of claim 4, further including means for engaging the coupon after it has been scanned and determined to be valid and redeemable, and for drawing the coupon away from the coupon receiving means and out of the reach of the operator.

6. The system of claim 5, further including a secure container, and including means associated with the coupon engaging means for delivering the validated coupon into the secure container.

7. The system of claim 6, further including coupon diverting means for directing the validated coupon in either of two flow paths after validation, leading to different areas of the secure container depending upon classification of the coupon.

8. A point-of-sale product and coupon bar code reader system for retail stores, including a product bar code reader having a housing, a reading beam, scanning optics for producing scan lines with the reading beam, collection optics and bar code decoding software, and for reading and verifying the use of redemption coupons bearing bar codes, as well as reading items for purchase in a consumer transaction, comprising, redemption coupon receiving means associated with the bar code reader, coupon detection means for signifying to the decoding software that a redemption coupon is being read, as opposed to a purchased item, coupon reading means connected to the bar code reader for scanning and reading a redemption coupon when a redemption coupon is placed at said redemption coupon receiving means, decode means for decoding the redemption coupon's bar code using the same bar code decoding software used for purchased products, correlation means for comparing the decoded information from a redemption coupon bar code with information representing purchases as determined from bar codes of purchased items in the same consumer transaction, and for determining whether the consumer should be credited in a redemption amount associated with the coupon, based on whether an appropriate qualified item has been purchased to qualify for coupon redemption, and the coupon reading means including movable door means providing an opening for insertion of a coupon, serving as said redemption coupon receiving means, beam diverting means for diverting the product bar code reader's reading beam to scan a coupon when it is placed through the coupon opening, and coupon cancellation means for cancelling the coupon and preventing future use of the coupon after it has been determined to be valid and redeemable.

9. The system of claim 8, wherein the coupon cancelling means comprises means for mutilating the coupon to the extent that it cannot be read as valid in a future transaction.

10. The system of claim 8, wherein the coupon cancelling means comprises means for applying ink to the coupon to prevent reading of the coupon's bar code in a future transaction.

11. A point-of-sale bar code reader for retail stores, having a housing, a reading beam, scanning optics for producing scan lines with the reading beam, collection optics and bar code decoding software, and for reading and verifying the use of redemption coupons bearing bar codes, as well as reading items for purchase in a consumer transaction, comprising, redemption coupon receiving means associated with the housing of the bar code reader, coupon detection means for signifying in the decoding software that a redemption coupon is being read, as opposed to a purchased item, coupon reading means associated with the scanning optics of the bar code reader for scanning and reading a redemption coupon using the same reading beam used in the scanning optics, when a redemption coupon is placed at said redemption coupon receiving means, means for decoding the redemption coupon's bar code, and correlation means for comparing the decoded information from a redemption coupon bar code with a list of purchases as determined from bar codes of purchased items in the same consumer transaction, and for determining whether the consumer should be credited in a redemption amount associated with the coupon, based on whether an appropriate qualified item has been purchased to qualify for coupon redemption, and the coupon reading means including movable door means providing an opening for insertion of a coupon, serving as said redemption coupon receiving means, beam diverting means for diverting the product bar code reader's reading beam to scan a coupon when it is placed through the coupon opening, and coupon securing means for engaging a coupon and delivering it into a secure area after the coupon has been determined to be valid and redeemable.

12. The system of claim 11, further including coupon cancellation means for making a physical indication of cancellation on the coupon after it has been determined to be valid and redeemable.

13. A point-of-sale bar code reader for retail stores, having a housing, a reading beam, scanning optics for producing scan lines with the reading beam, collection optics and bar code decoding software, and for reading and verifying the use of redemption coupons bearing bar codes, as well as reading items for purchase in a consumer transaction, comprising, redemption coupon receiving means associated with the housing of the bar code reader, coupon detection means for signifying in the decoding software that a redemption coupon is being read, as opposed to a purchased item, coupon reading means associated with the scanning optics of the bar code reader for scanning and reading a redemption coupon using the same reading beam used in the scanning optics, when a redemption coupon is placed at said redemption coupon receiving means, means for decoding the redemption coupon's bar code, and correlation means for comparing the decoded information from a redemption coupon bar code with a list of purchases as determined from bar codes of purchased items in the same consumer transaction, and for determining whether the consumer should be credited in a redemption amount associated with the coupon, based on whether an appropriate qualified item has been purchased to qualify for coupon redemption, and the redemption coupon receiving means comprising an openable door adjacent to the product bar code reader for receiving coupons entered by an operator, and wherein the coupon reading means comprises movable mirror means for diverting the reading beam of the product bar code reader to a coupon scanning location when a coupon is to be read, and further including isolation means for sealing the scanning optics of the product bar code reader from a path through which the coupon travels.

14. The system of claim 13, further including means for engaging the coupon after it has been scanned and determined to be valid and redeemable, and for drawing the coupon away from the coupon receiving means and out of reach of an operator.

15. The system of claim 14, further including a secure container, and including means associated with the coupon engaging means for delivering the validated coupon into a secure container.

16. The system of claim 15, further including coupon diverting means for directing the validated coupon in either of two flow paths after validation, leading to different areas of the secure container depending upon classification of the coupon.

17. A point-of-scale bar code reader for retail stores, having a housing, a reading beam, scanning optics for producing scan lines with the reading beam, collection optics and bar code decoding software, and for reading and verifying the use of redemption coupons bearing bar codes, as well as reading items for purchase in a consumer transaction, comprising, redemption coupon receiving means associated with the housing of the bar code reader, coupon detection means for signifying in the decoding software that a redemption coupon is being read, as opposed to a purchased item, coupon reading means associated with the scanning optics of the bar code reader for scanning and reading a redemption coupon using the same reading beam used in the scanning optics, when a redemption coupon is placed at said redemption coupon receiving means, means for decoding the redemption coupon's bar code, and correlation means for comparing the decoded information from a redemption coupon bar code with a list of purchases as determined from bar codes of purchased items in the same consumer transaction, and for determining whether the consumer should be credited in a redemption amount associated with the coupon, based on whether an appropriate qualified item has been purchased to qualify for coupon redemption, and the coupon reading means including movable door means providing an opening for insertion of a coupon, serving as said redemption coupon receiving means, beam diverting means for diverting the product bar code reader's reading beam to scan a coupon when it is placed through the coupon opening, and coupon cancellation means for cancelling the coupon and preventing future use of the coupon after it has been determined to be valid and redeemable.

18. The system of claim 17, wherein the coupon cancelling means comprises means for mutilating the coupon to the extent that it cannot be read as valid in a future transaction.

19. The system of claim 17, wherein the coupon cancelling means comprises means for applying ink to the coupon to prevent reading of the coupon's bar code in a future transaction.

* * * * *